(12) United States Patent
Nishioka et al.

(10) Patent No.: US 7,364,197 B2
(45) Date of Patent: *Apr. 29, 2008

(54) STEERING COLUMN APPARATUS

(75) Inventors: Masaki Nishioka, Gunma (JP); Naoki Sawada, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 10/958,344

(22) Filed: Oct. 6, 2004

(65) Prior Publication Data
US 2005/0093281 A1    May 5, 2005

(30) Foreign Application Priority Data
Oct. 7, 2003    (JP)    ............................ P.2003-347949

(51) Int. Cl.
*B62D 1/18*    (2006.01)
(52) U.S. Cl. .................. 280/775; 280/779; 74/493
(58) Field of Classification Search ................ 280/775, 280/779; 74/492, 493
See application file for complete search history.

(56) References Cited

U.S. PATENT DOCUMENTS

| 6,279,951 | B1* | 8/2001 | Cartwright et al. | .......... 280/775 |
|---|---|---|---|---|
| 6,792,824 | B2* | 9/2004 | Jolley et al. | ................... 74/493 |
| 6,902,192 | B2* | 6/2005 | Sato et al. | ................... 280/775 |
| 7,069,809 | B2* | 7/2006 | Sato et al. | ..................... 74/493 |
| 7,090,250 | B2* | 8/2006 | Kinoshita et al. | ........... 280/775 |

FOREIGN PATENT DOCUMENTS

| GB | 2 281 375 A | 3/1995 |
|---|---|---|
| JP | 63-114771 U | 7/1988 |
| JP | 63-117662 U | 7/1988 |
| JP | 04-110671 U | 9/1992 |
| JP | 2588338 Y2 | 10/1998 |

* cited by examiner

*Primary Examiner*—Paul N. Dickson
*Assistant Examiner*—Drew J. Brown
(74) *Attorney, Agent, or Firm*—Sughrue MIon, PLLC

(57)    ABSTRACT

A steering column apparatus, includes: a fixed column member having a vehicle body attachment portion to be attached to a vehicle body; a column head supported by the fixed column member movably in a direction of a center shaft of the fixed column member; a wheel shaft, rotatably supported by the column head, for fixing a steering wheel to an end thereof; a column clamp, provided in the column head, for putting the column head into a state in which the column head is clamped to or unclamped from the fixed column member; an operation lever having a rocking shaft in the column head; and a mechanical transmission apparatus for transmitting a rocking motion of the operation lever to the column clamp.

15 Claims, 14 Drawing Sheets

STEERING COLUMN APPARATUS

BACKGROUND OF THE INVENTION

1. Field of the Invention

The present invention generally relates to a steering column apparatus, and more particularly to a steering column apparatus, which has a telescopic mechanism, for a vehicle and to a steering apparatus, which has both a telescopic mechanism and a tilting mechanism, for a vehicle.

2. Background Art

The telescopic mechanism and the tilting mechanism are mechanisms for adjusting the height of a steering wheel and an angle of inclination to a position, in which a driver can drive the vehicle, according to the figure and the taste of the driver.

The telescopic mechanism and the tilting mechanism are each provided with a clamp/unclamp mechanism to be operated when the height of the steering wheel and the angle of inclination are adjusted. At this adjustment, the clamp/unclamp mechanisms therefor are once unclamped. After the height and the angle of inclination are adjusted in that state, the clamp/unclamp mechanisms are brought into a clamped state again.

The adjustment of the height of the steering wheel and the angle of inclination is performed by manually operating the steering wheel. Thus, it is preferable that the clamp/unclamp mechanism can be operated without unhanding the steering wheel. The specification of British patent application publication No. 2281375 discloses a steering column apparatus provided with a single operating lever that can be operated while the hands of a driver are kept put on the steering wheel.

In the steering column disclosed in the aforementioned British patent application publication, the clamp/unclamp mechanism of the telescopic mechanism is provided at a side thereof, which is fixed to a vehicle body. An operation lever, the tilting mechanism, and the clamp/unclamp mechanisms thereof are provided at a steering wheel side, the height of which is adjusted with respect to the vehicle body. Therefore, the operation lever is disposed apart from the clamp/unclamp mechanism of the telescopic mechanism. Additionally, the distance therebetween varies as the height of the steering wheel is adjusted.

Thus, the movement of the operation lever is transmitted to the clamp/unclamp mechanism of the telescopic mechanism through a cable enabled to move in a flexible tube. Large flextures are imparted to this cable and the tube so as to provide a sufficiently small curvature enabling the cable to freely move in the whole adjustment range of the steering wheel. Thus, the cable and the tube partly protrude outwardly from the steering column apparatus. This is not only indecorous but causes troubles. Further, the transmission mechanism consisting of the cable and the tube is poor in reliability. Additionally, the cable expands and contracts, so that the operability of the apparatus is not favorable.

SUMMARY OF THE INVENTION

A problem to be solved by the invention is to provide a steering column apparatus enabled so that the clamp/unclamp mechanism of the telescopic mechanism or both the clamp/unclamp mechanisms of the telescopic mechanism and the tilting mechanism can be operated by the operation lever provided in the vicinity of the steering wheel, that the stiffness of the clamp/unclamp mechanism of the telescopic mechanism is large, that the structure thereof is simple, that the cost thereof is low, and that no parts thereof protrude therefrom.

Also, another problem to be solved by the invention is to provide a steering wheel apparatus adapted so that the position of the operation lever is constant regardless of the adjustment position of an angle of inclination of the steering wheel, and that the operability thereof is favorable.

To solve the problems, the invention provides a steering column apparatus, including a fixed column member having a vehicle body attachment portion to be attached to a vehicle body, a column head supported by the fixed column member movably in a direction of a center shaft of the fixed column member, a wheel shaft, rotatably supported by the column head, for fixing a steering wheel to an end thereof, a column clamp, provided in the column head, for putting the column head into a state in which the column head is clamped to or unclamped from the fixed column member, an operation lever having a rocking shaft in the column head, and a mechanical transmission apparatus for transmitting a rocking motion of the operation lever to the column clamp.

The invention also provides a steering column apparatus, including: a fixed column member having a vehicle body attachment portion to be attached to a vehicle body; a column head supported by the fixed column member unrotatably around a center shaft and movably in a direction of the center shaft; a tilt head tiltably supported by the column head; a wheel shaft, rotatably supported by the tilt head, for fixing a steering wheel to an end thereof; a column clamp, provided in the column head, for putting the column head into a state in which the column head is clamped to or unclamped from the fixed column member; a tilt head clamp for clamping/unclamping the tilt head to/from the column head; an operation lever having a rocking shaft in one of the column head and the tilt head; and a mechanical transmission apparatus for transmitting a rocking motion of the operation lever to the column clamp and to the tilt head clamp.

BRIEF DESCRIPTION OF THE DRAWINGS

The present invention may be more readily described with reference to the accompanying drawings.

DETAILED DESCRIPTION OF THE PREFERRED EMBODIMENTS

Hereinafter, embodiments of the invention are described with reference to the accompanying drawings.

First Embodiment

General Overview

Figure 1:
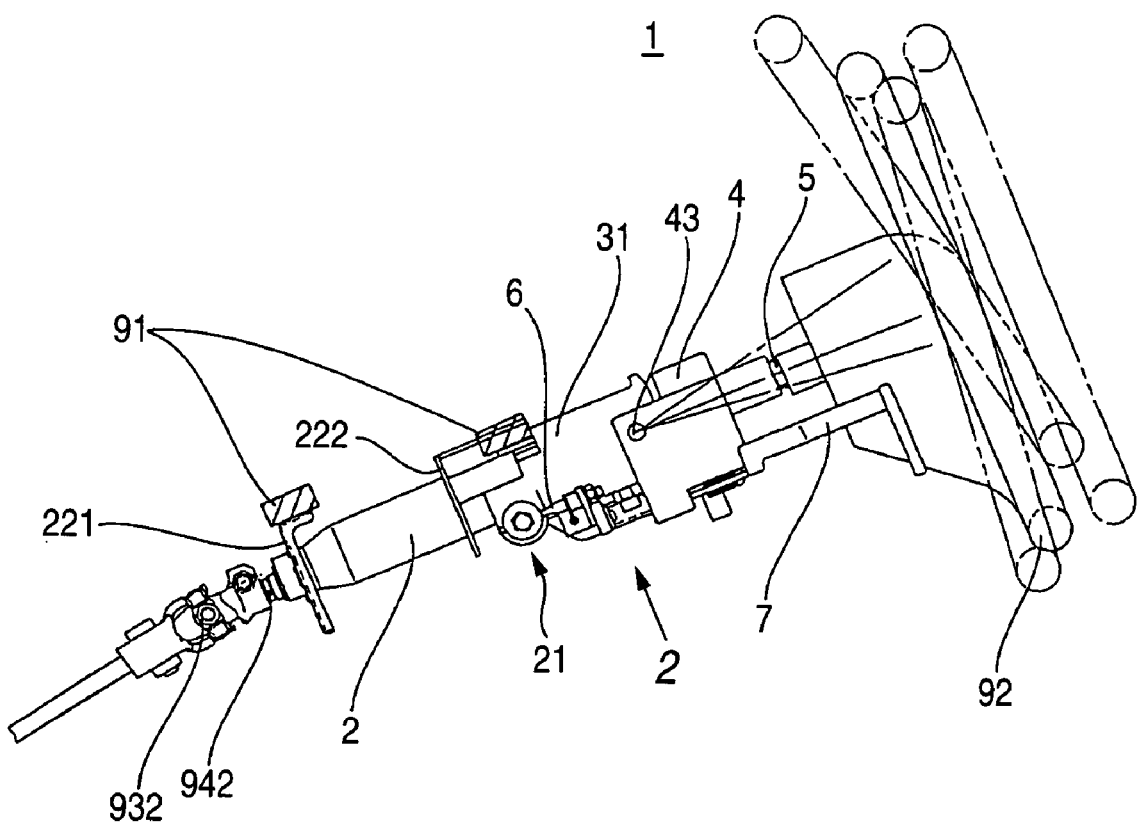
FIG. 1 is an external view of a steering column apparatus according to a first embodiment of the invention.

FIG. 1 is an external view showing a steering column apparatus 1 according to a first embodiment of the invention. The steering column apparatus 1 has a fixed column member 2, a column head 31, a tilt head 4, a wheel shaft 5, a column clamp 21, a tilt head clamp 41 (see FIG. 3), an operation lever 7, and a mechanical transmission apparatus.

The fixed column member 2 has vehicle body attachment portions 221 and 222. The fixed column member 2 is attached to a vehicle body 91 by the vehicle attaching portions 221 and 222. The column head 31 is supported by the fixed column member 2 unrotatably around the center shaft and movably in the direction thereof. The tilt head 4 is supported by this column head 31 tiltably around the tilt center shaft 43. The wheel shaft 5 is rotatably supported by this tilt head 4. A steering wheel 92 is fixed to one end of the wheel shaft 5.

The column head 31 is provided with a column clamp shaft 6 enabled to rotate around an axis being parallel with the center shaft of the fixed column member 2. The column head 31 has a column clamp 21. The column head 31 can be put into a clamped state and an unclamped state by rotations of the column clamp shaft 6.

Also, the column head 31 is provided with the tilt head clamp 41 that clamps the tilt head 4 to and unclamps the tilt head 4 from the column head 31. The operation lever 7 is supported by a rocking shaft in the tilt head 4. This operation lever 7 can be operated during the hands of a driver are kept put on the steering wheel 92. A rocking motion of the operation lever 7 is converted into a turn of the column clamp shaft 6 through the mechanical transmission apparatus. This turn is transmitted to the column clamp 21 to thereby clamp or unclamp the column head 31. Also, the rocking motion of the operation lever 7 is transmitted to the tilt head clamp 41 to thereby clamp or unclamp the tilt head 4.

An end of the wheel shaft 5 is connected to a universal joint 931 (see FIG. 3) in the steering column apparatus 1, and also to a mechanism for operating the direction of front wheels, through a pair of an upper intermediate shaft 941 (see FIG. 3) and a lower intermediate shaft 942 spline-connected to each other and a lower universal joint 932. Incidentally, double-dash-chain lines indicate some examples of a height position and an inclined posture that the steering wheel 92 can take by the adjustment thereof.

Tilt Head Clamp

Figure 2:
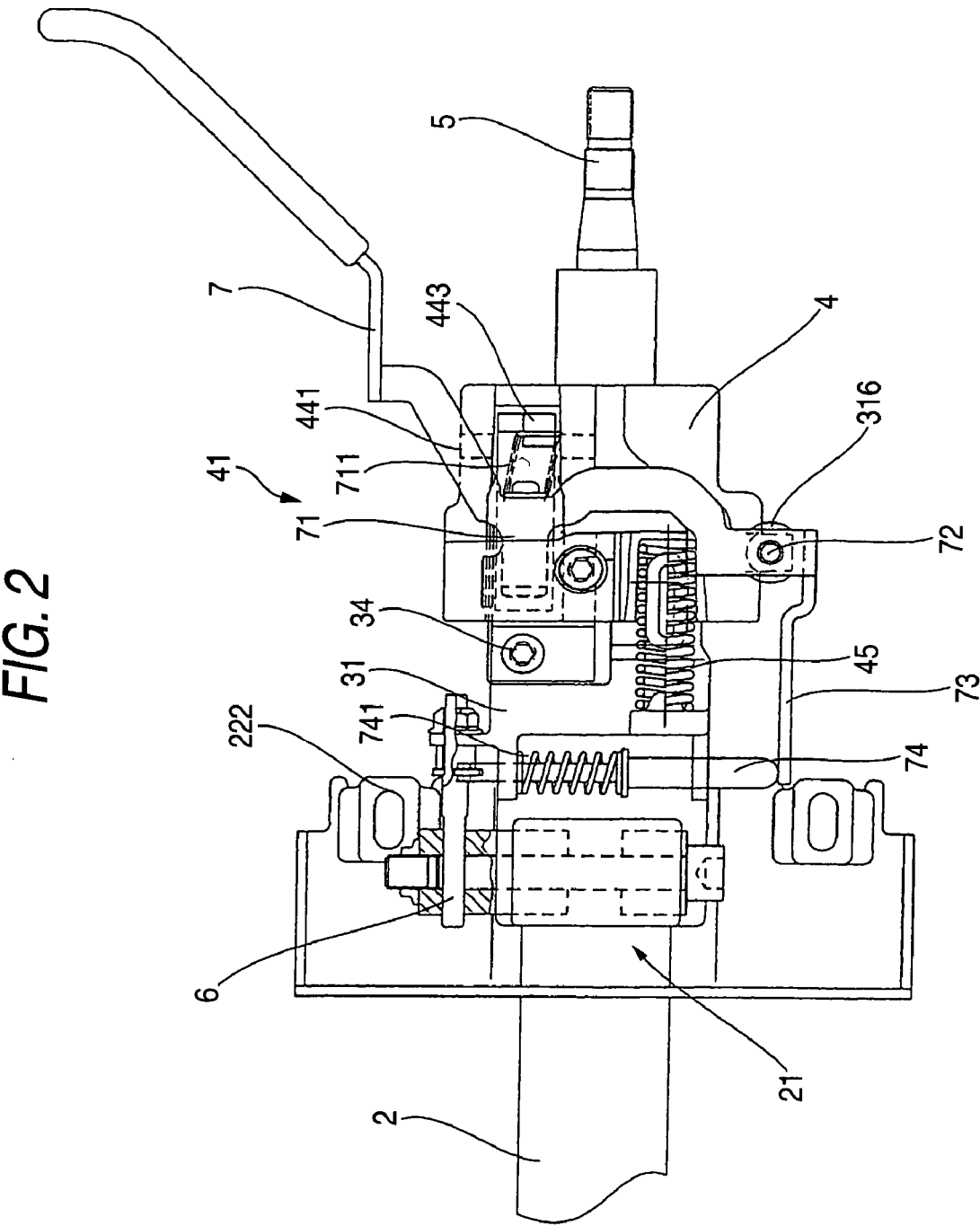
FIG. 2 is a bottom view of the steering column apparatus 1 according to the first embodiment, which is taken from a lower part of FIG. 1 (from a direction 2).
Figure 3:
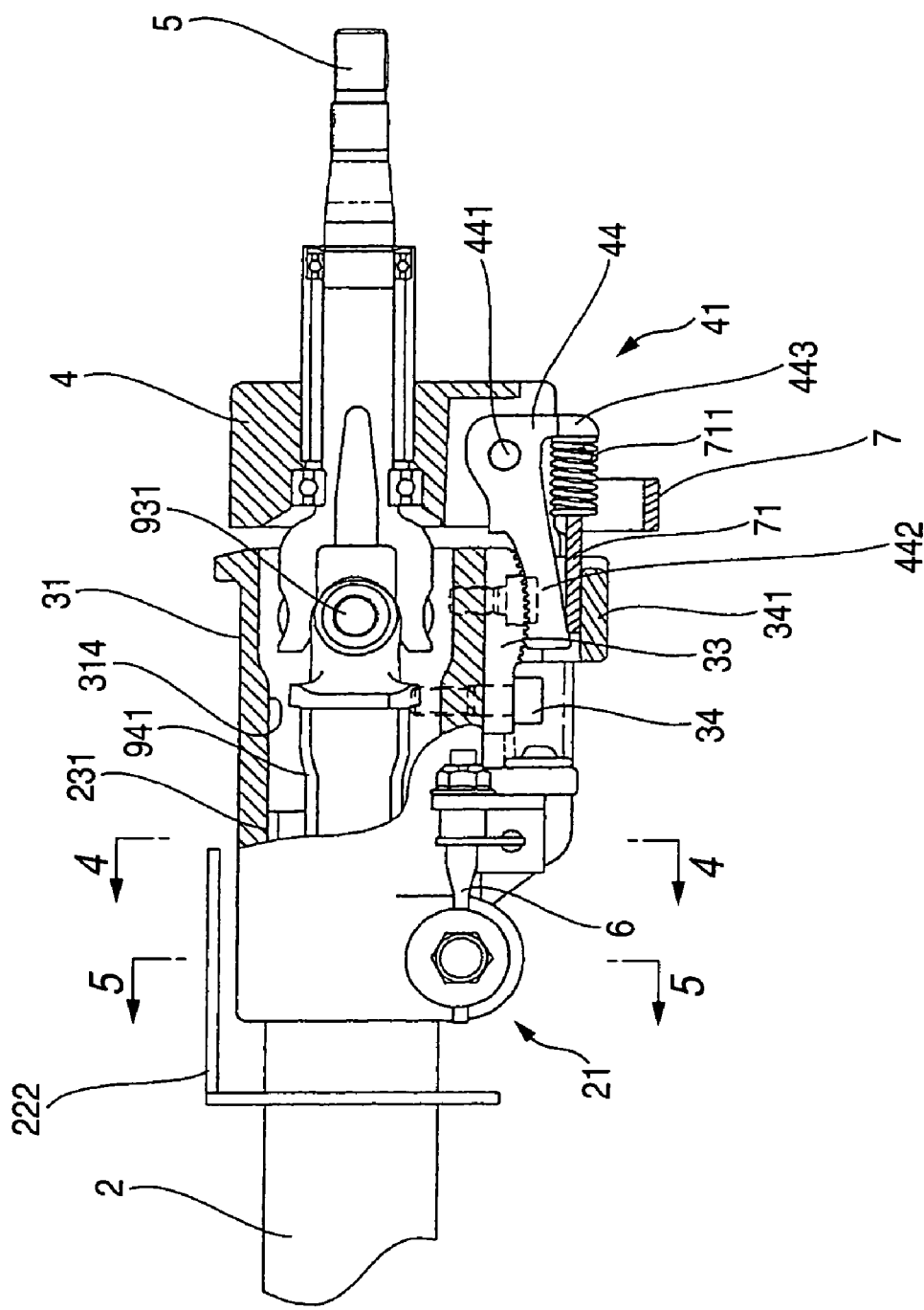
FIG. 3 is a partly cut-away enlarged view of the steering column apparatus, which shows a major part of FIG. 1.
Figure 4:
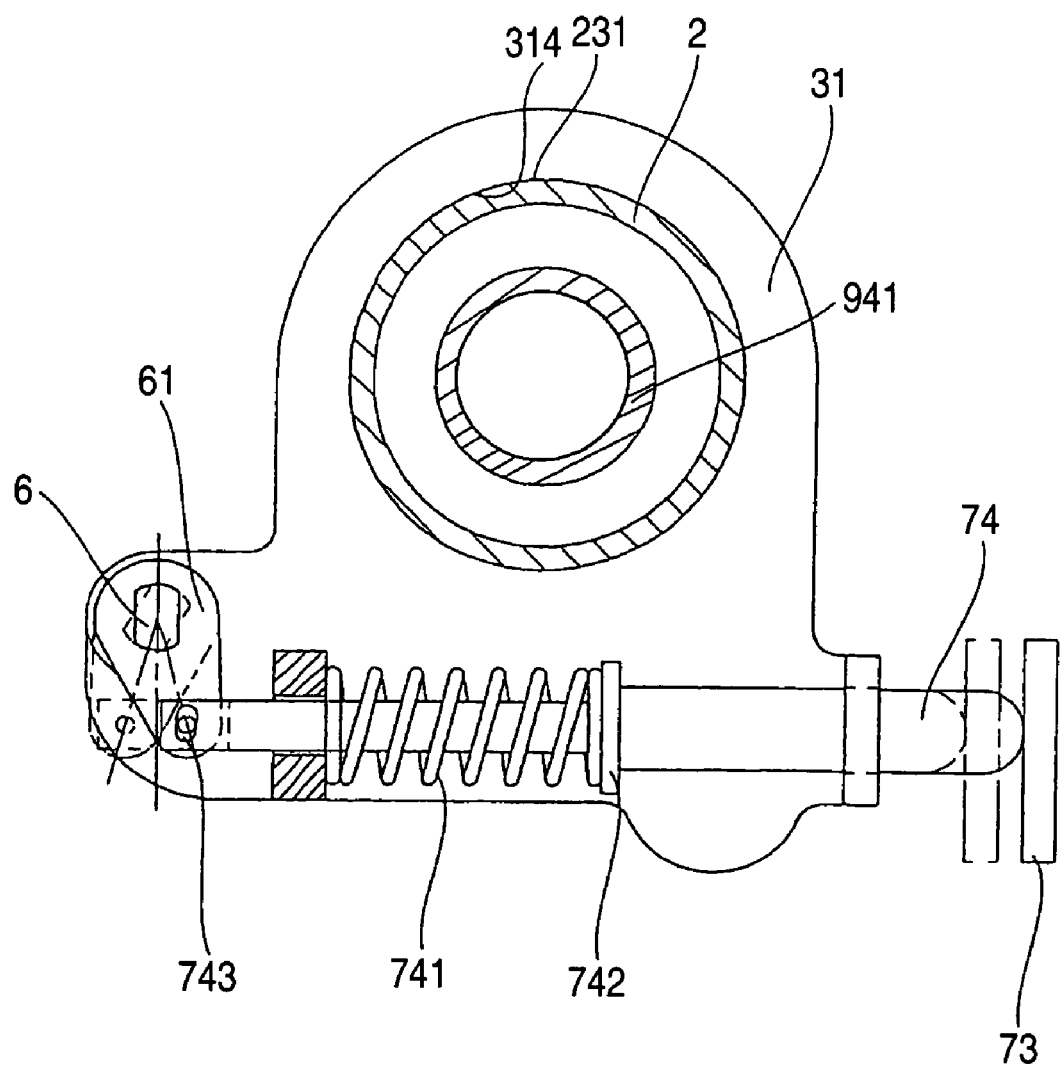
FIG. 4 is a cross-sectional view of the first embodiment, which is taken along line 4-4 shown in FIG. 3.
Figure 5:
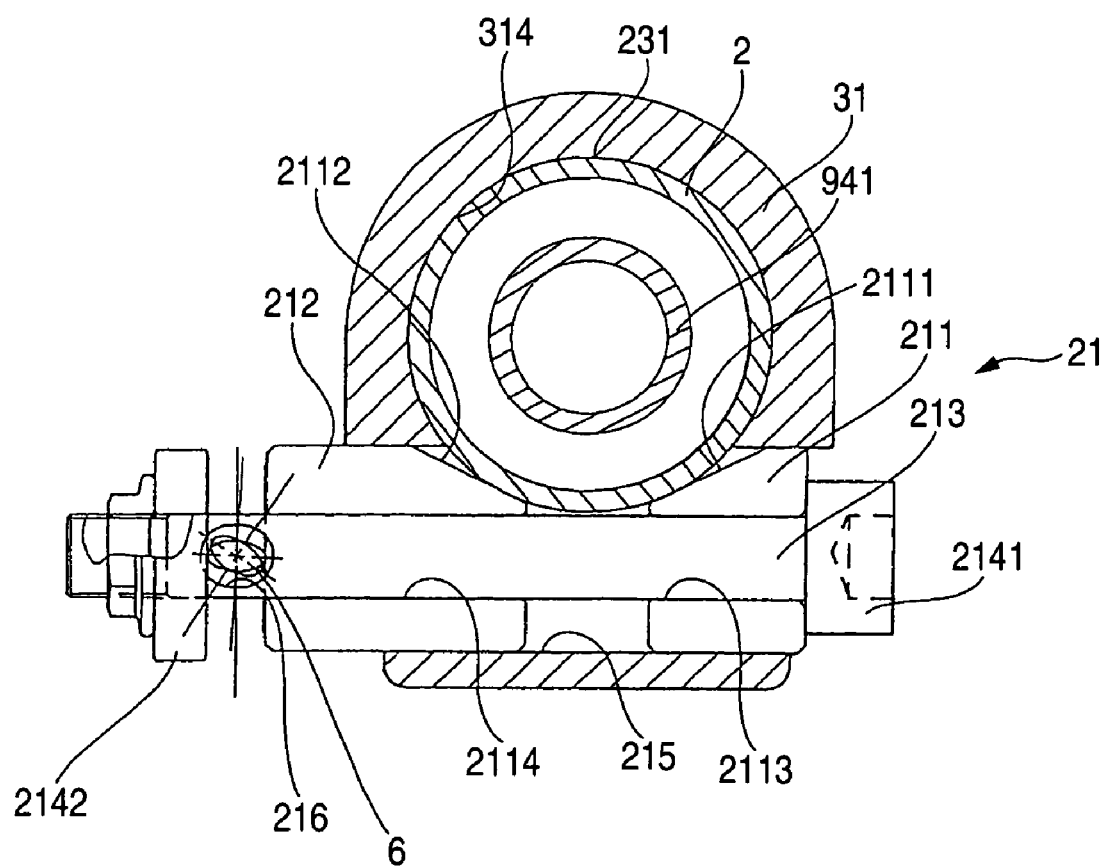
FIG. 5 is a cross-sectional view of the first embodiment, which is taken along line 5-5 shown in FIG. 3.

FIG. 2 is a bottom view of the steering column apparatus 1, which is taken from a lower part of FIG. 1 (from a direction 2). FIG. 3 is a partly cut-away enlarged view of the steering column apparatus 1, which shows a major part of FIG. 1. FIGS. 4 and 5 are cross-sectional views thereof, which are respectively taken along line 4-4 and line 5-5 shown in FIG. 3.

As shown in FIGS. 2 to 3, the tilt head clamp 41 has the following configuration. A segment gear 33, whose center is positioned on the tilt center shaft 43, is fixed to the column head 31 by a bolt 34. A back contact member 341 is installed in the column head 31 so that a space is provided between the back contact member 341 and the segment gear 33. On the other hand, a gear portion 442 of a gear arm 44, which is supported by the tilt head 4 rotatably around a shaft 441, and a projection portion 71 provided in the operation lever 7 are set in the space.

The gear arm 44 is L-shaped, which comprises two legs. The gear portion 442 is formed in one of the lets. A spring 711 is interposed between the other leg 443 of the gear arm 44 and the back of the projection portion 71 and gives a bias serving to broaden the space between the back part of the projection portion 71 and the leg 443.

The projection portion 71 is leftwardly pushed owing to this bias, and thus pushes the gear portion 442 from behind. Consequently, the gear portion 442 is pushed against the segment gear 33, so that the threads of the gear portion 442 and the segment gear 33 are meshed with each other. Incidentally, when the gear portion 442 pushes the segment gear 33, the back contact portion 341 receives a reaction force applied to the projection portion 71. Consequently, the tilt head 4 is fixed to the column head 31, The tilt head 4 is fixed at a stepwise position in an angular position in which the gear portion 442 and the segment gear 33 can mesh with each other.

When the projection portion 71 of the operation lever 7 rightwardly moves, as viewed in FIG. 3, the gear arm 44 is counterclockwise turned by a pushing force of the spring 711, as viewed in this figure. Thus, the engagement between these threads is canceled. Therefore, the apparatus is adapted so that at adjustment of a tilt position (at that time, a telescopic position can be adjusted), the projection portion 71 is rightwardly moved by operating the operation lever 7.

Universal Joint and Intermediate Shaft

As shown in FIG. 3, an upper universal joint 931 is configured between an end portion of the upper intermediate shaft 941 and an end portion of the wheel shaft 5. The center of the universal joint 931 is located on the axis of the tilt center shaft 43 and thus unaffected by tilting the tilt head 4.

As shown in FIG. 1, the lower intermediate shaft 942 is rotatably supported by the fixed column member 2. Also, the lower intermediate shaft 942 and the upper intermediate shaft 941 are spline-connected to each other. The column head 31 is enabled to laterally move, as viewed in FIG. 1. The spline-connection enables the transmission of rotation of the upper intermediate shaft 941 to the lower intermediate shaft 942, regardless of the position to which the column head 31 moves. Even when the height of the steering wheel 92 is adjusted, the rotation of the steering wheel 92 can be transmitted to the lower intermediate shaft 942.

Fixed Column Member

As shown in FIGS. 3 and 5, the fixed column member 2 has a cylindrical sliding guide portion 231. A cylindrical inner surface 314 of the column head 31 is fitted onto the cylindrical sliding guide portion 231. The column head 31 is movable in the direction of an axis of the fixed column member 2 without wobbling. An elongated hole extending along an axial direction (not shown) is formed in the cylindrical sliding guide portion 231 of the fixed column member 2. A stopper member (not shown) provided in the column head 31 engages in this elongated hole. The column head 31 is prevented by the elongated hole and the stopper member from slipping out of and rotating with respect to the fixed column member 2. Thus, the fixed column member 2 is movable in the axial direction within the range of the elongated hole in the fixed column member 2.

Column Clamp

The configuration of the column clamp 21 is described by using FIGS. 2, 3, 4, and 5. FIG. 4 shows a cross-sectional view taken along line 4-4 shown in FIG. 3. FIG. 5 shows a cross-sectional view taken along line 5-5 shown in FIG. 3. The column clamp 21 is provided in the column head 31 and has a first wedge 211, a second wedge 212, a clamp bar 213, and reaction members 2141 and 2142. A wedge hole 215 is bored in the column head 31 sideways, and partly opened in the cylindrical inner surface 314 of the column head 31.

The first wedge 211 and the second wedge 212 have inclined surfaces 2111 and 2112, respectively, and are accommodated in the wedge hole 215 so that the inclined surfaces 2111 and 2112 face each other. These inclined surfaces 2111 and 2112 of the two wedges face the cylindrical sliding guide portion 231 of the fixed column member 2.

Clamp bar holes 2113 and 2114 are bored in the first wedge 211 and the second wedge 212, respectively. The clamp bar 213 penetrates through these holes. The reaction members 2141 and 2142, which are larger in outside diameter than the clamp bar holes 2113 and 2114, are fixed to both ends of the clamp bar 213, respectively. A column clamp shaft hole 216 is bored in the clamp bar 213 in such a way as to come in contact with one of the reaction members 2142. A substantially elliptical noncircular cross-sectional portion of the column clamp shaft 6 penetrates through this hole.

A rocking arm 61 (see FIG. 4) is fixed to an end of the column clamp shaft 6. The direction of the major axis of the elliptical cross-section of the noncircular cross-sectional portion of the column clamp shaft 6 is inclined when the unclamping is performed. Meanwhile, when the clamping is performed, the direction of the major axis thereof is directed to an axial direction of the clamp bar 213. With this configuration, when a counterclockwise rocking rotation of the rocking arm 61 is performed, the column clamp shaft 6 is also turned counterclockwise.

When the direction of the major axis of the elliptic cross-section of the column clamp shaft 6 is directed to the axial direction of the clamp bar 213, one of the elliptic major axis parts leftwardly pushes the reaction member 2142, the clamp bar 213 is leftwardly pulled. Further, the reaction member 2141 leftwardly pushes the first wedge 211.

Meanwhile, the second wedge 212 is rightwardly pushed by the other elliptic major axis part. Consequently, the two wedges come close to each other. Thus, the inclined surfaces 2111 and 2112 push the cylindrical sliding guide portion 231 of the fixed column member 2, so that the column head 31 is clamped to the fixed column member 2. Incidentally, the first wedge 211 and the second wedge 212 can slightly and laterally move as one body. Thus, an unbalanced condition, in which only one of the wedges strongly pushes the fixed column member 2, does not occur.

When a clockwise rocking rotation of the rocking arm 61 is performed, the first wedge 211 and the second wedge 212 perform motions reversely with respect to the aforementioned motions thereof and go apart from each other. Thus, the column head 31 is unclamped.

Operation Lever and Interlocked Operation

Next, each of members, which operate by interlocking with an operation of the operation lever 7, is described. The operation lever 7 is disposed on a lower side of the steering column apparatus 1. In FIG. 2, this operation lever 7, a lever center shaft 72 serving as the center of this rocking motion, a pusher plate 73 fixed to the operation lever 7, and a pusher rod 74 are shown. The lever center shaft 72 is axially supported by a cylindrical boss 316 provided on a side surface of the tilt head 4.

The pusher rod 74 having a flange 742 is supported on the column head 31 slidably in a direction being parallel to the tilt center shaft 43. A pressing spring 741 for pressing the flange 742 rightwardly, as viewed in FIG. 4, penetrates through the pusher rod 74. A small elongated hole 743 elongated in a direction perpendicular to the pusher rod 74 is provided in an end portion thereof. The end portion of the pusher rod 74 is shaft-engaged with an end of the rocking arm 61 through this elongated hole 743. The elongated hole 743 functions to absorb an amount of shift of a position, at which the pusher rod 74 is connected to the rocking arm 61, when the pusher rod 74 is axially moved.

The pressing spring 41 rightwardly pushes the pusher rod 74. Thus, the right end of the pusher rod 74 always abuts against the pusher plate 73. A pressing force for causing a counterclockwise turn is imparted to the rocking arm 61, which is shaft-engaged with the right end of the pusher rod 74. The pressing force for rocking, which is given to the rocking arm 61, maintains the column clamp shaft 6 in a clamp position. The position of the rocking arm 61 at that time is indicated by a solid line.

Pusher Plate

The tilt head 4 is tilted on the column head 31. Thus, the positional relation between the tilt head 4 and the pusher head 31 changes according to an amount (or angle) of tilt. The pusher rod 74 is supported by the column head 31. Thus, the position of the pusher plate 73 is not changed by being tilted. However, the pusher plate 73 is disposed away from the tilt center shaft 43. Thus, the relative positions of the pusher plate 73 and the pusher rod 74 change when the tilt head 4 is tilted. Therefore, the pusher plate 73 has a wide abutting surface bent like a hockey stick so that the pusher rod 74 abuts against the pusher plate at any angular position.

Operation of Adjusting Steering Wheel

Hereunder, an operation of adjusting the height of the steering wheel 92 and the angle of inclination thereof and that of each of the members are described. A driver pulls the operation lever 7 by extending, for example, fingers from the forefinger to the little finger while his hand (the thumb) is kept put on the steering wheel 92. Consequently, the operation lever 7 rocks around the lever center shaft 72.

The rocking motion of the operation lever 7 causes the projection portion 71 to move rightwardly, as viewed in FIG. 3. Thus, the gear arm 44 turns counterclockwise. The turn of the gear arm 44 causes cancellation of the engagement between the threads of the segment gear 33 and the gear portion 442 of the gear arm 44 to thereby enable the tilting of the tilt head 4.

Simultaneously, the rocking motion of the operation lever 7 causes the pusher plate 73 to rock (FIG. 2). By this rocking motion, the pusher plate 73 upwardly pushes the pusher rod 74, as viewed in this figure (FIG. 2), against the pressing spring 741. The aforementioned movement corresponds to the leftward movement of the pusher rod 74, as viewed in FIG. 4.

The leftward movement of the pusher rod 74 causes a rocking motion of the rocking arm 61, thus, a clockwise turn of the column clamp shaft 6. When the column clamp shaft 6 turns, the column clamp shaft 6 having been in a state, in which a major axis part thereof is in a horizontal position, is brought into a state in which the major axis part thereof is inclined. Consequently, the first wedge 211 and the second wedge 212 are spaced apart from each other. Thus, the column head 31 is unclamped.

This enables the tilting of the tilt head 4 and the movement of the column head 31 in the direction of the height thereof. Thus, the driver can adjust the height position and the tilting position of the steering wheel 92 without unhanding the steering wheel 92 and the operation lever 7. Incidentally, when the tilt head clamp 41 is unclamped, a downward force due to the weight thereof acts upon the tilt head 4, similarly to a case where a person puts his head down. Therefore, a stiffening spring 45 (see FIG. 2) for counterbalancing is provided. To cancel such a force, and/or to facilitate the driver's getting-on and getting-off operations, a force for maintaining the steering wheel 92 at a highest inclined position is applied to the tilt head 4.

Upon completion of the adjustment, when the finger put on the operation lever 7 is released, the operation lever 7 is returned to an initial position by the forces of the pressing spring 741 (and the spring 711). When the operation lever 7 is returned to the initial position, both the tilt head 4 and the column head 31 are clamped by performing an operation reversely with respect to the aforementioned operation. When the operation lever 7 is not operated, the pressing spring 741 applies a force for maintaining this operation lever 7 at a place, which is apart from the steering wheel 92, and also maintaining the column clamp 21 and the tilt head clamp 41 in the clamped positions, respectively.

According to the first embodiment, the column clamp 21 is provided in the column head 31. Thus, a path for transmitting a force from the operation lever 7 to the column clamp 21 is shortened. The structure of the apparatus is simplified. Thus, the manufacturing cost thereof can be reduced.

Second Embodiment

Hereinafter, a second embodiment, in which the operation lever 7 is adapted not to operate by following a tilting operation, is described. FIGS. 6, 7, 8, and 9 are drawings for explaining the second embodiment, and correspond to FIGS. 1, 2, 3, and 4, respectively. The second embodiment is substantially similar to the first embodiment except the structure of the operation lever 7, that of the tilt head clamp 41, and that of the column clamp 21. However, the second embodiment is described hereunder without avoiding redundancy.

General Overview

Figure 6:
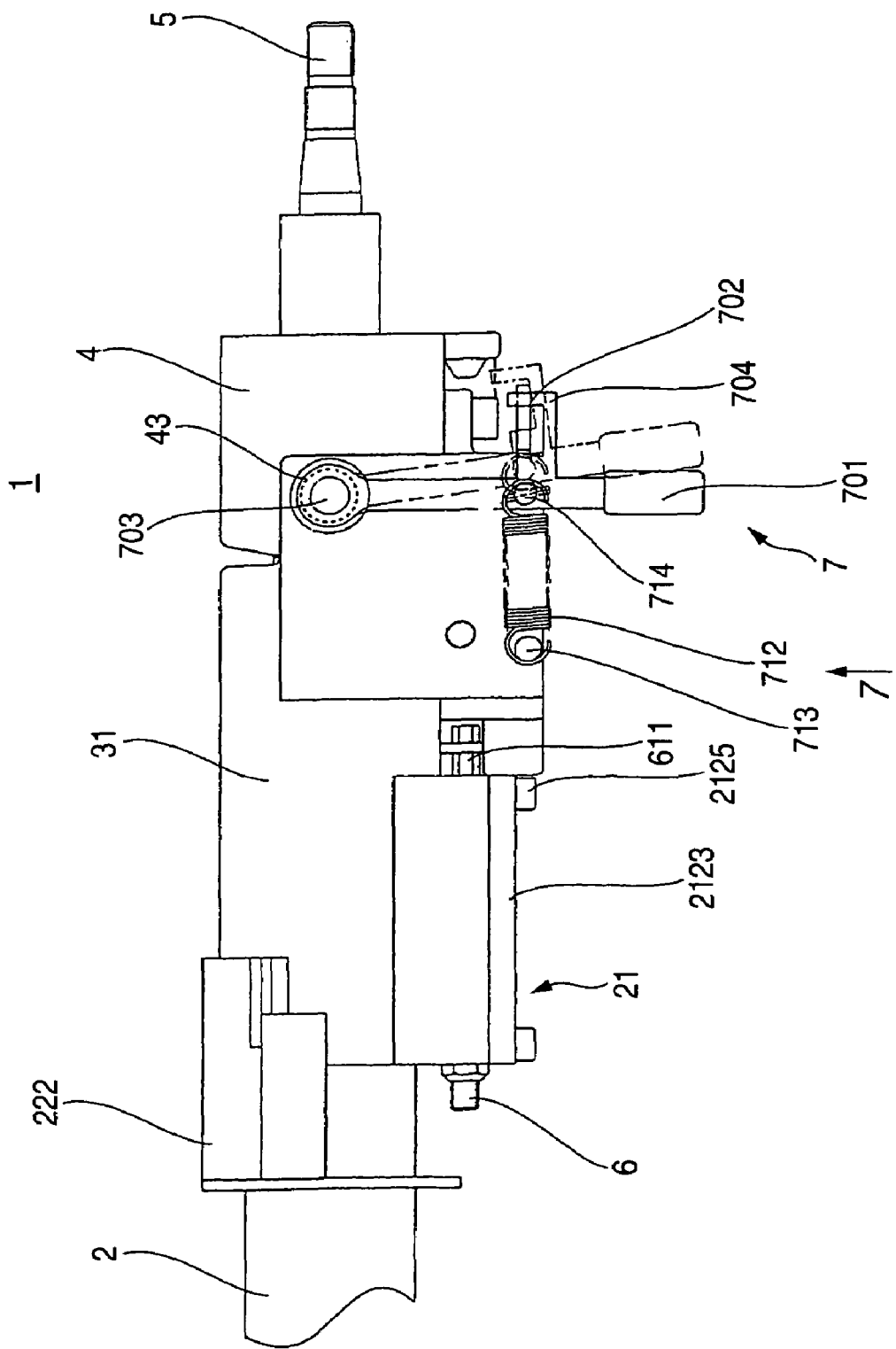
FIG. 6 is an external view of a steering column apparatus according to a second embodiment of the invention.

FIG. 6 is an external view showing a steering column apparatus 1 according to the second embodiment of the invention. The steering column apparatus 1 has a fixed column member 2, a column head 31, a tilt head 4, a wheel shaft 5, a column clamp 21, a tilt head clamp 41 (see FIG. 8), an operation lever 7, and a mechanical transmission apparatus.

Although FIG. 6 does not show the left half of the fixed column member 2, the left half of the fixed column member 2 has a structure, which is the same as that of the left half of the fixed column member 2 of the first embodiment shown in FIG. 1. Thus, the second embodiment is described by using reference characters described in FIG. 1. As shown in FIGS. 1 and 6, the fixed column member 2 has vehicle body attachment portions 221 (FIG. 1) and 222. The fixed column member 2 is attached to a vehicle body 91 (FIG. 1) by the vehicle attaching portions 221 and 222. The column head 31 is supported by the fixed column member 2 unrotatably around the center shaft and movably in the direction thereof.

The column head 31 is supported by the fixed column member 2 unrotatably around the center shaft and movably in the direction thereof. The tilt head 4 is supported by this column head 31 tiltably around the tilt center shaft 43 indicated by a dotted line. The wheel shaft 5 is rotatably supported by this tilt head 4. A steering wheel (not shown) is fixed to the right end of the wheel shaft 5.

The column head 31 is provided with a column clamp shaft 6 enabled to rotate around an axis being parallel with the center shaft of the fixed column member 2. The column head 31 has a column clamp 21. The column head 31 can be clamped to and unclamped from the fixed column member 2 by rotations of this column clamp shaft 6.

Also, the column head 31 is provided with the tilt head clamp 41 (FIG. 8) that clamps the tilt head 4 to and unclamps the tilt head 4 from the column head 31. Differently from the first embodiment, the operation lever 7 comprises an operating lever 701, which is supported by the column head 31 in such a way as to be rocked by a lever center shaft 703, and a driven lever 702 adapted to rock by following the rocking motion of this operating lever 701. Although the lever center shaft 703 is provided on an axis of the tilt center shaft 43, it is possible that the lever center shaft 703 is not provided on this axis. A driver puts his right hand on the steering wheel 92 and then releases his left hand. This operating lever 701 is operated by using the released left hand.

A rocking motion of the operation lever 7 is transmitted to the driven lever 702 and converted into a turn of the column clamp shaft 6 through the mechanical transmission apparatus. This turn is transmitted to the column clamp 21 to thereby clamp or unclamp the column head 31. Also, the rocking motion of this operating lever 701 is transmitted to the tilt head clamp 41 to thereby clamp or unclamp the tilt head 4.

An end of the wheel shaft 5 is connected to a universal joint 931 (FIG. 8) in the steering column apparatus 1, and also to a mechanism for operating the direction of front wheels, through a pair of an upper intermediate shaft 941 and a lower intermediate shaft 942 (FIG. 1) spline-connected to each other and a lower universal joint 932 (FIG. 1).

Tilt Head Clamp

Figure 7:
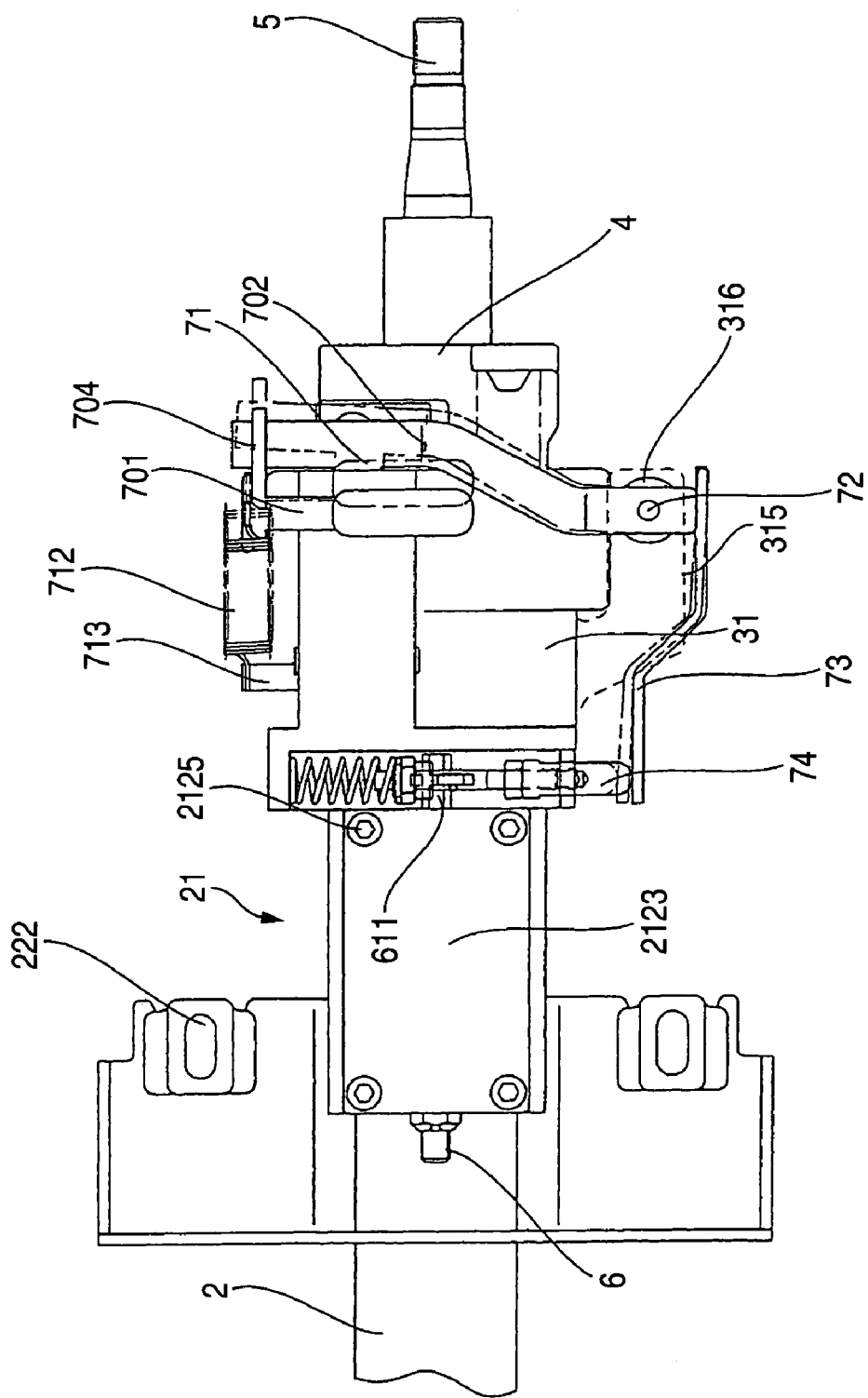
FIG. 7 is a bottom view of the steering column apparatus according to the second embodiment, which is taken from a lower part of FIG. 6 (from a direction 7).
Figure 8:
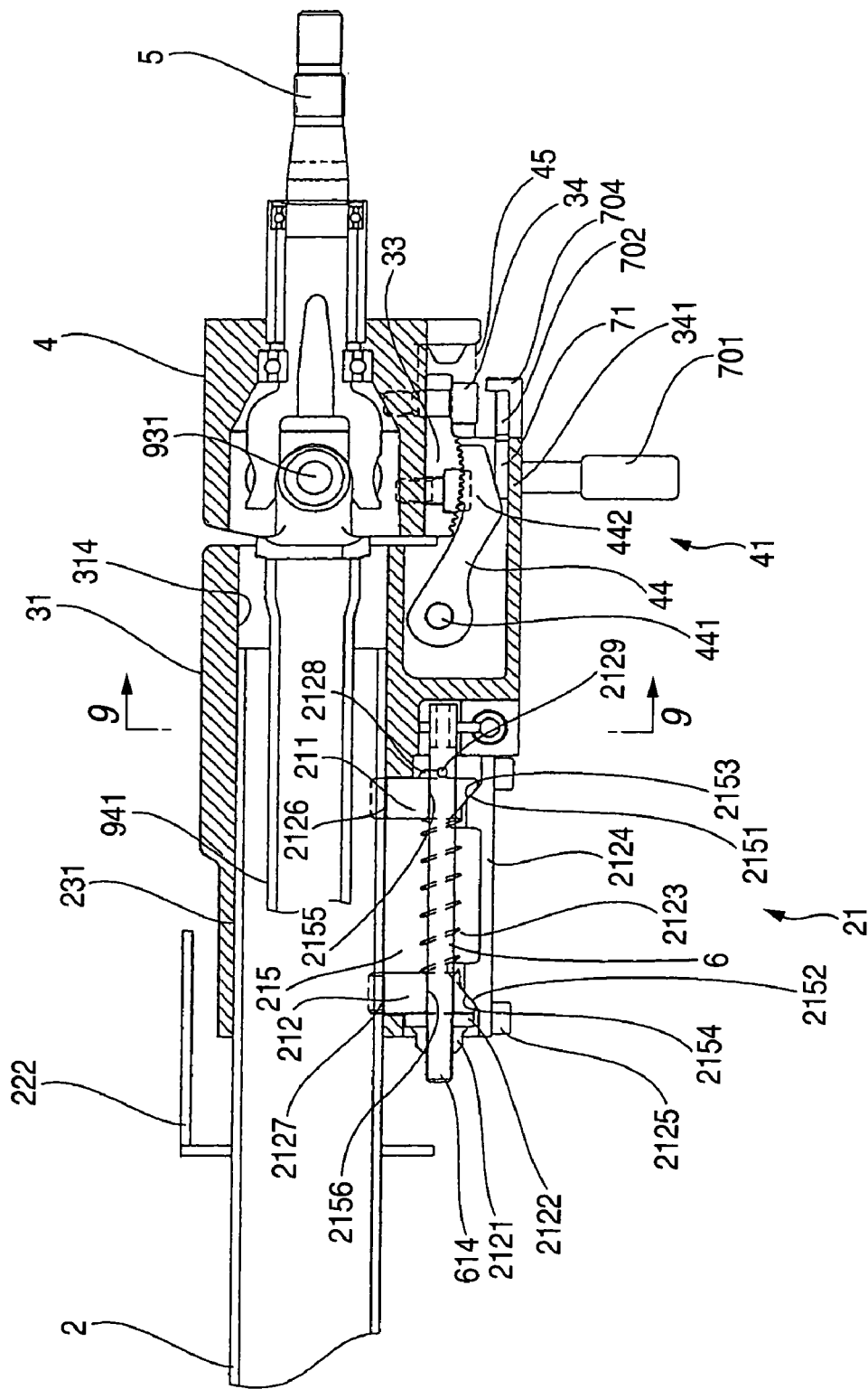
FIG. 8 is a longitudinally cross-sectional view of the second embodiment shown in FIG. 6.
Figure 9:
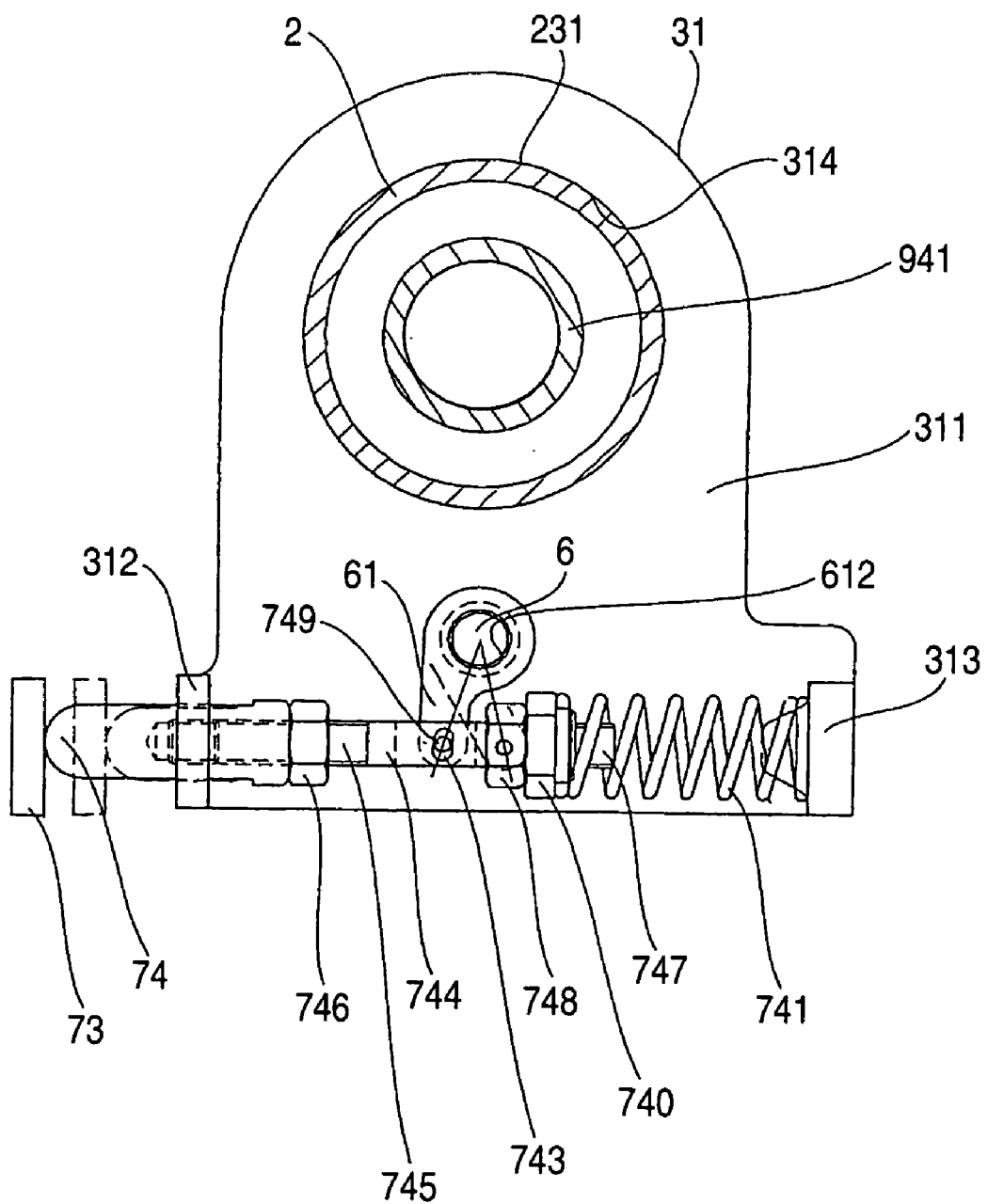
FIG. 9 is across-sectional view of the second embodiment, which is taken along line 9-9 shown in FIG. 8.

FIG. 7 is a bottom view of the steering column apparatus 1, which is taken from a lower part of FIG. 6 (from a direction 7). FIG. 8 is a partly cut-away enlarged view of the steering column apparatus 1, which shows a major part of FIG. 1. FIG. 9 is a cross-sectional view thereof, which is taken along line 9-9 shown in FIG. 8.

As shown in FIGS. 6 to 8, the tilt head clamp 41 has the following configuration. In the tilt head clamp 41, a segment gear 33, whose center is positioned on the tilt center shaft 43, is fixed to the column head 31 by a bolt 34. A back contact member 341 is installed in the column head 31 so that a space is provided between the back contact member 341 and the segment gear 33. On the other hand, a gear portion 442 of a gear arm 44, which is supported by the tilt head 4 rotatably around a shaft 441, and a projection portion 71 provided in the driven lever 702 are set in the space. That is, an attaching place, to which the segment gear 33 is attached, and an attaching place, to which the gear arm 44 is attached, are set by reversing the attaching places of the segment gear 33 and the gear arm 44 in the first embodiment.

Differently from the first embodiment, the gear arm 44 is shaped nearly like a straight line. The gear portion 442 is formed at the right side thereof. A spring 712 is provided in a tensioned state between a shaft pin 714, which is implanted nearly at a middle place in the direction of length of the operating lever 701, and a shaft pin 713 implanted in the column head 31. The spring 712 gives a bias serving to cause the operating lever 701 to swing clockwise.

The projection portion 71 provided on the driven lever 702 is leftwardly pushed owing to this bias, as viewed in FIG. 8, and thus pushes the gear portion 442 from behind. Consequently, the gear portion 442 is pushed against the segment gear 33, so that the threads of the gear portion 442 and the segment gear 33 are meshed with each other. Incidentally, when the gear portion 442 pushes the segment gear 33, the back contact portion 341 receives a reaction force applied to the projection portion 71. Consequently, the tilt head 4 is fixed to the column head 31. The tilt head 4 is fixed at a stepwise position in an angular position in which the gear portion 442 and the segment gear 33 can mesh with each other.

When the projection portion 71 of the operation lever 7 rightwardly moves, as viewed in FIG. 8, the gear arm 44 is clockwise turned due to the own weight thereof, as viewed in this figure. Thus, the engagement between these threads is canceled. Therefore, the apparatus is adapted so that at adjustment of a tilt position (at that time, a telescopic position can be adjusted), the projection portion 71 is rightwardly moved by operating the operating lever 701.

Universal Joint and Intermediate Shaft

As shown in FIG. 8, an upper universal joint 931 is configured between an end portion of the upper intermediate shaft 941 and an end portion of the wheel shaft 5. The center of the universal joint 931 is located on the axis of the tilt center shaft 43 and thus unaffected by tilting the tilt head 4.

The lower intermediate shaft 942 (FIG. 1) is rotatably supported by the fixed column member 2. The lower intermediate shaft 942 and the upper intermediate shaft 941 are spline-connected to each other. The column head 31 is enabled to laterally move, as viewed in FIG. 6. The spline-connection enables the transmission of rotation of the upper intermediate shaft 941 to the lower intermediate shaft 942, regardless of the position to which the column head 31 moves. Even when the height of the steering wheel 92 is adjusted, the rotation of the steering wheel can be transmitted to the lower intermediate shaft 942.

Fixed Column Member

As shown in FIGS. 8 and 9, the fixed column member 2 has a cylindrical sliding guide portion 231. A cylindrical inner surface 314 of the column head 31 is fitted onto the cylindrical sliding guide portion 231. The column head 31 is movable in the direction of an axis of the fixed column member 2 without wobbling. An elongated hole extending along an axial direction (not shown) is formed in the cylindrical sliding guide portion 231 of the fixed column member 2. A stopper member (not shown) provided in the column head 31 engages in this elongated hole. The column head 31 is prevented by the elongated hole and the stopper member from slipping out of and rotating with respect to the fixed column member 2. Thus, the fixed column member 2 is movable in the axial direction within the range of the elongated hole in the fixed column member 2.

Column Clamp

The configuration of the column clamp 21 is described by using FIGS. 6, 7, 8, and 9. FIG. 9 shows a cross-sectional view taken along line 9-9 shown in FIG. 8. Differently from the first embodiment, the column clamp 21 employs a structure in which the column head 21 is clamped to the fixed column member 2 by two wedges provided at places spaced apart from each other in an axial direction of the column head 31.

That is, the column clamp 21 is provided in the column head 31 and has the column clamp shaft 6, a pin 2129, a first wedge 211, a pressing spring 2123, a second wedge 212, a thrust bearing 2122, and a nut 2121, which are arranged in this order from the right side of FIG. 8. A wedge hole 215 is bored in the column head 31 from below. An upper part of this wedge hole 215 is opened in the cylindrical inner surface 314 formed in the column head 31.

A lower part of the wedge hole 215 is closed by a cover 2124 fixed to the column head 31 with four bolts 2125. The first wedge 211 and the second wedge 212 are inserted into the wedge hole 215 slidably in an upward-downward direction and in a lateral direction, as viewed in FIG. 8.

Substantially V-shaped clamping surfaces 2126 and 2127, which face the fixed column member 2, are formed on the first wedge 211 and the second wedge 212, respectively. These clamping surfaces 2126 and 2127 face the cylindrical sliding guide portion 231 of the fixed column member 2. When the column head 31 is clamped, the clamping surfaces 2126 and 2127 touches the outer periphery of the cylindrical sliding guide portion 231 at two points spaced apart from each other in the circumferential direction of the cylindrical sliding guide portion 231. Thus, the column head 31 is clamped to the fixed column member 2.

The first wedge 211 and the second wedge 212 are disposed at places spaced apart in an axial direction of the column head 31, respectively. Clamp shaft holes 2155 and 2156 are bored in the first wedge 211 and the second wedge 212, respectively. The column clamp shaft 6 penetrates through these holes. A nut 2121 is screwed into a screw 614 formed at the left end of the column clamp shaft 6 and pushes the thrust bearing 2122 in such a way as to come into contact with the second wedge 212.

The pressing spring 2123 is fitted onto the column clamp shaft 6 between the first wedge 211 and the second wedge 212, and applies a pressing force acting in a direction, in which the first wedge 211 and the second wedge 212 are always spaced apart from each other, to the wedges. A sector cam surface 2128 is formed around the clamp shaft hole 2155 in the right end surface of the first wedge 211. The pin 2129, which is fixed to the column clamp shaft 6, and the sector cam surface 2128 are always in contact with each other and constitute a cam mechanism.

Also, inclined surfaces 2153 and 2154 outwardly descending in an axial direction of the column head 31 are formed on the cover 2124. Inclined surfaces 2151 and 2152 formed on the bottoms of the first wedge 211 and the second wedge 212 are in contact with the inclined surfaces 2153 and 2154, respectively. The rocking motion of the rocking arm 61 (FIG. 9) causes the rotation of the column clamp shaft 6.

When a rocking rotation (a clockwise rocking rotation shown in FIG. 9) of the rocking arm 61 is caused so as to change an unclamped state to a clamped state shown in FIG. 8, the column clamp shaft 6, the nut 2121, and the thrust bearing 2122 turn, so that the pin 2129 goes up onto a peak from a valley of the sector cam surface 2128 through an inclined surface and then stops. To rightwardly pull the column clamp shaft 6, the second wedge 212 is rightwardly pushed by the thrust bearing 2122, while the first wedge 211 is leftwardly pushed by the pin 2129. Thus, the two wedges come close to each other.

Consequently, the inclined surfaces 2151 and 2152 move along the inclined surfaces 2153 and 2154 of the cover 2124. The first wedge 211 and the second wedge 212 rise, so that the clamping surface 2126 of the first wedge 211 and the clamping surface 2127 of the second wedge 212 push the cylindrical sliding guide portion 231 of the fixed column member 2. Thus, the column head 31 is clamped to the fixed column member 2 at two places spaced apart from each other in the axial direction of the column head 31.

In this way, the column head 31 is clamped to the fixed column member 2 at least at two places spaced apart from each other in the direction of the center shaft of the column head 31. Thus, the clamp stiffness is high. The column head 31 is not loosened from the fixed column member 2 by vibrations or the like. Further, the cam mechanism constituted by the pin 2129 and the sector cam surface 2128 can obtain a large moving distance in an axial direction of the column clamp shaft 6 by using a small angle of rotation of the column clamp shaft 6. Thus, an operating angle of the operating lever 701 can be reduced.

When the rocking arm 61 having been in the clamped state shown in FIGS. 8 and 9 is caused to perform a rocking rotation (a counterclockwise rocking rotation, as viewed in FIG. 9), the column clamp shaft 6 turns in a direction opposite to the direction of rotation thereof during clamped, so that the pin 2129 moves from the peak of the sector cam surface 2128 to the valley through the inclined surface. Thus, the first wedge 211 and the second wedge 212 are forcibly spaced apart from each other by the pressing force of the pressing spring 2123. Then, the first wedge 211 and the second wedge 212 come down, so that the claming surfaces 2126 and 2127 detach from the outer periphery of the cylindrical sliding guide portion 231. Thus, the column head 31 is unclamped. In this manner, the unclamping thereof is forcibly performed by the pressing force of the pressing spring 2123. Consequently, the unclamping thereof can surely be performed.

Operation Lever and Interlocked Operation

Next, each of members, which operate by interlocking with an operation of the operation lever 7, is described. The operating lever 701 is disposed on a side surface of the steering column apparatus 1. The driven lever 702 rocking by following the rocking motion of the operating lever 701 is disposed on the bottom surface of the steering column surface 1. In FIG. 7, this driven lever 702, a lever center shaft 72 serving as the center of this rocking motion, a pusher plate 73 fixed to the driven lever 702, and a pusher rod 74 are shown. A bracket 315 extending like a letter "L" toward the tilt head 4 (rightwardly) is formed on a side surface of the column head 31. The lever center shaft 72 is axially supported by a cylindrical boss 316 provided on this bracket 315.

As shown in FIGS. 6 and 7, a concave engaging recess portion 704 is integrally formed at a substantially middle position in the direction of length of the operating lever 701. The rocking motion of the operating lever 701 is transmitted to the driven lever 702 by engaging the driven lever 702 with this engaging recess portion 704.

As shown in FIG. 9, the pusher rod 74 is supported by a rib 312, which is provided at the left side of the bottom of the bracket 311 downwardly extending from the column head 31, in such away as to be slidable in a direction being parallel to the tilt center shaft 43. A screw 745 at the left side of the bolt 744 is screwed into the right end of the pusher rod 74 and fixed with a nut 746 after the screwing length thereof is adjusted.

A pressing spring 741 for pressing the bolt 744 leftwardly, as viewed in FIG. 9, is inserted between a rib 313, which is formed at the right side of the bottom of the bracket 311, and a collar 740. A small elongated hole 743 elongated in an upward-downward direction is provided in a middle position of the bolt 744. The bolt 744 is engaged with an end of the rocking arm 61 by a pin 749 through this elongated hole 743. The elongated hole 743 is used for absorbing an amount of shift of a position, at which the hole 743 engages with the rocking arm 61, when the pusher rod 74 and the bolt 744 are laterally moved.

The pressing spring 741 leftwardly presses the bolt 744. Thus, the left end of the pusher rod 74 always abuts against the pusher plate 73. A pressing force for causing a clockwise turn is imparted to the rocking arm 61, which is engaged with the bolt 744 by the pin 749. The pressing force for rocking, which is given to the rocking arm 61, maintains the column clamp shaft 6 in a clamp position. The position of the rocking arm 61 at that time is indicated by a solid line.

A polygon-shaped cross-sectional shaft 611 (FIGS. 6 and 7) is formed in the column clamp 6. This polygon-shaped cross-sectional shaft 611 penetrates through and is fitted into a polygon-shaped cross-sectional hole 612 of the rocking arm 61. Therefore, the rotation of the rocking arm 61 can be transmitted to the column clamp shaft 6.

Pusher Plate

The tilt head 4 is tilted on the column head 31. Thus, the positional relation between the tilt head 4 and the pusher head 31 changes according to an amount (or angle) of tilt. However, the operating lever 701, the driven lever 702, and the column clamp 21 are supported by the column head 31. Thus, the relative positions thereamong are unchanged by performing tilting. The pusher plate 73 always abuts against the pusher rod 74. Thus, the structure following the tilting operation is unnecessary. The structure of the pusher plate 73 is reduced in size.

Operation of Adjusting Steering Wheel

Hereinafter, an operation of adjusting the height of the steering wheel 92 and the angle of inclination thereof and that of each of the members are described. A driver pulls the operating lever 701 by extending his left hand while his right hand is kept put on the steering wheel 92. Consequently, the operating lever 701 swings counterclockwise around the lever center shaft 703, as indicated by double-dash-chain lines in FIG. 6.

The rocking motion of the operating lever 701 causes the projection portion 71 of the driven lever 702 to move rightwardly, as viewed in FIG. 8. Thus, the gear arm 44 turns counterclockwise. The turn of the gear arm 44 causes cancellation of the engagement between the threads of the segment gear 33 and the gear portion 442 of the gear arm 44 to thereby enable the tilting of the tilt head 4.

Simultaneously, the rocking motion of the driven lever 702 causes the pusher plate 73 to rock. By this rocking motion, the pusher plate 73 upwardly pushes the pusher rod 74, as viewed in FIG. 7, against the pressing spring 741. The aforementioned movement corresponds to the rightward movement of the pusher rod 74, as viewed in FIG. 9.

The rightward movement of the pusher rod 74 causes a counterclockwise rocking motion of the rocking arm 61, which is shown in FIG. 9, thus, a turn in the same direction of the column clamp shaft 6. When the column clamp shaft 6 turns, the pin 2129 of the column clamp shaft 6 moves from the peak of the sector cam surface 2128 to the valley thereof through the inclined surface. Consequently, the first wedge 211 and the second wedge 212 having been close to each other are spaced apart from each other by the pressing force of the pressing spring 2123. Thus, the column head 31 is unclamped.

This enables the tilting of the tilt head 4 and the movement of the column head 31 in the direction of the height thereof. Thus, the driver can adjust the height position and the tilting position of the steering wheel. Adjustment of the position of the steering wheel by both hands can be achieved by providing a tentative holding mechanism enabled to maintain the unclamped state of the column clamp 21 and the tilt head clamp 41 even when hands are released from the operating lever 701. Incidentally, when the tilt head clamp 41 is unclamped, a downward force due to the weight thereof acts upon the tilt head 4, similarly to the case where a person puts his head down. Therefore, a stiffening spring 45 (FIG. 8) for counterbalancing is provided. To cancel such a force, and/or to facilitate the driver's getting-on and getting-off operations, a force for maintaining the steering wheel 92 at a highest inclined position is applied to the tilt head 4.

Upon completion of the adjustment, when the finger put on the operating lever 701 is released, the operating lever 701 and the driven lever 702 are returned to initial positions (the positions indicated by solid lines in FIGS. 6 and 7) by the forces of the pressing spring 741 (and the spring 712). When the operating lever 701 and the driven lever 702 are returned to the initial positions, both the tilt head 4 and the column head 31 are clamped by performing an operation reversely with respect to the aforementioned operation. When the operation lever 7 is not operated, the pressing spring 741 and the spring 712 apply forces for maintaining the column clamp 21 and the tilt head clamp 41 in the clamped positions, respectively.

The second embodiment obtains the following advantages in addition to the advantages of the first embodiment. That is, the operating lever 701 maintains the constant position thereof, regardless of the tilting position of the tilt head 4. The driver can perform a quick operation at an accustomed operating lever position without being absorbed in change of the operation lever position. Further, because all the gear arm 44, the operating lever 701, and the driven lever 702 are provided at the side of the column head 31, the relative positions of the gear arm 44 and the projection portion 71 engaged with this gear arm 44 do not change. Thus, operations of clamping/unclamping the tilt head 4 can smoothly be performed.

Third Embodiment

A steering column apparatus according to a third embodiment has a structure, which is substantially similar to those of the first embodiment and the second embodiment as a whole. Therefore, the redundant description thereof is omitted. Further, reference characters used in the description thereof are substantially similar to those used in the descriptions of these embodiments. Each of the operation lever 7 and the tilt head clamp 41 of this steering column apparatus has a structure, which is the same as that of a corresponding one of the operation lever 7 and the tilt head clamp 41 of the second embodiment. A structure enabling the shortening of the mechanical transmission path from the operation lever 7 to the column clamp 21 and the fastening of the wedges of the column clamp 21 by screws is added to this steering column apparatus as another feature of the third embodiment.

Figure 10:
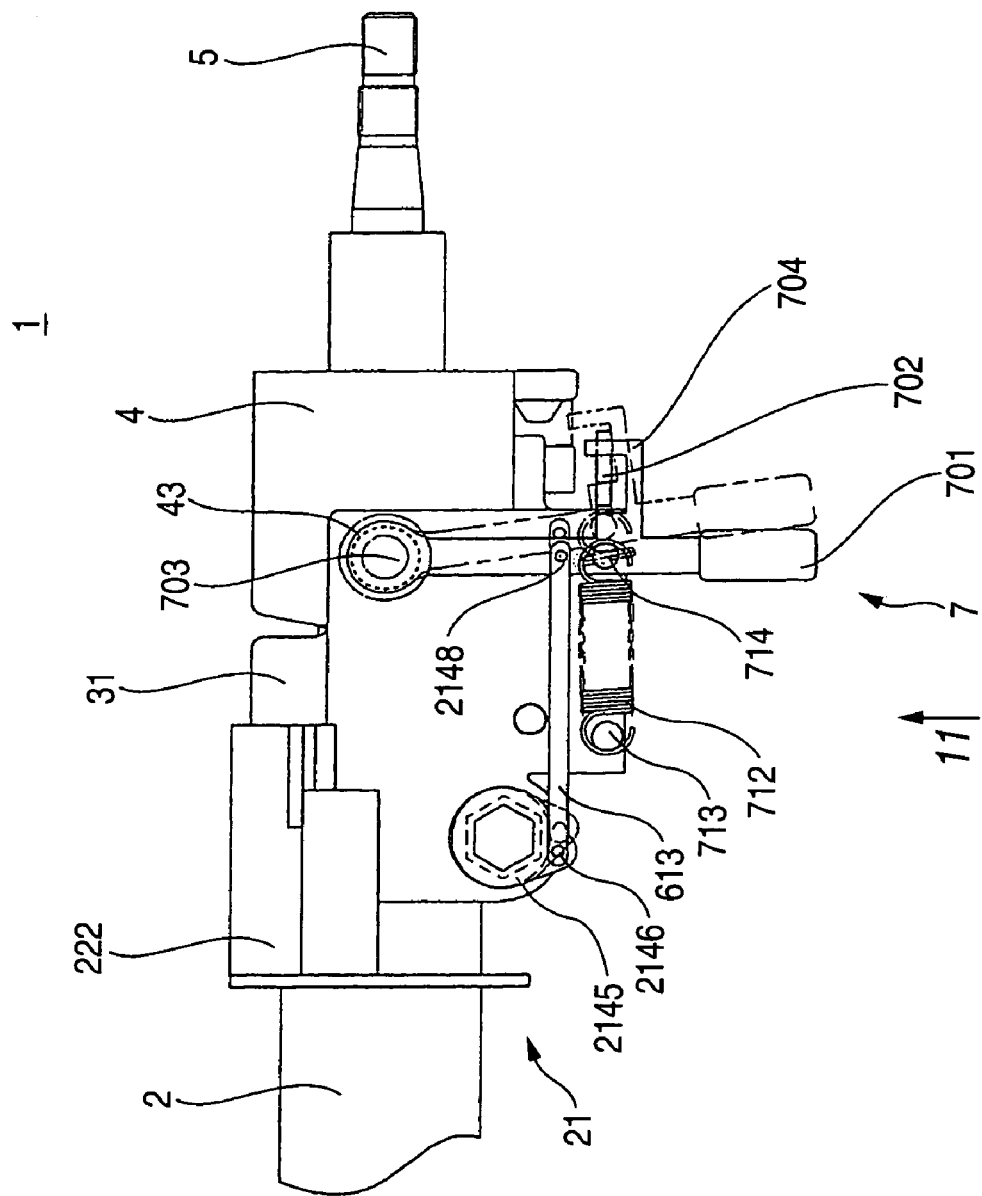
FIG. 10 is an external view of a steering column apparatus according to a third embodiment of the invention.
Figure 11:
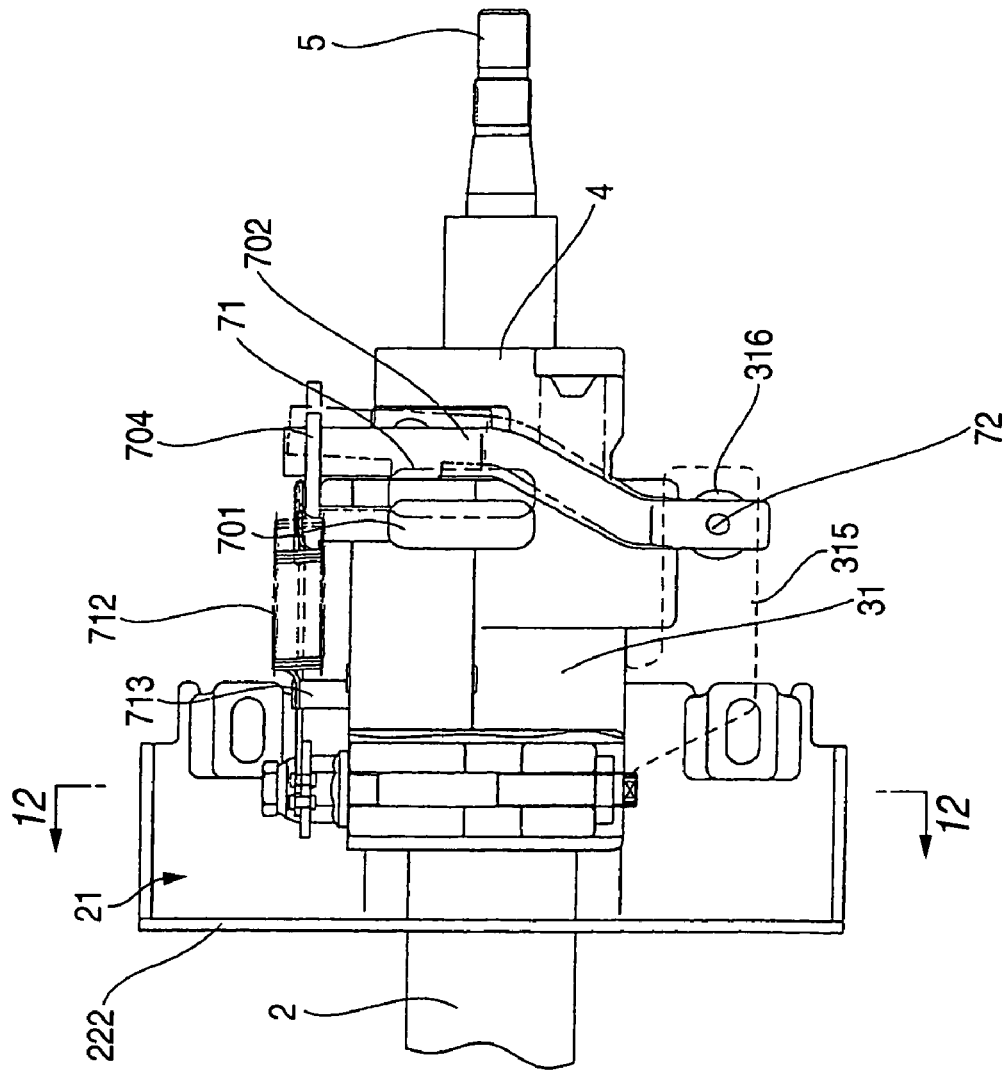
FIG. 11 is a bottom view of the steering column apparatus according to the third embodiment, which is taken from a lower part of FIG. 10 (from a direction 11).
Figure 12:
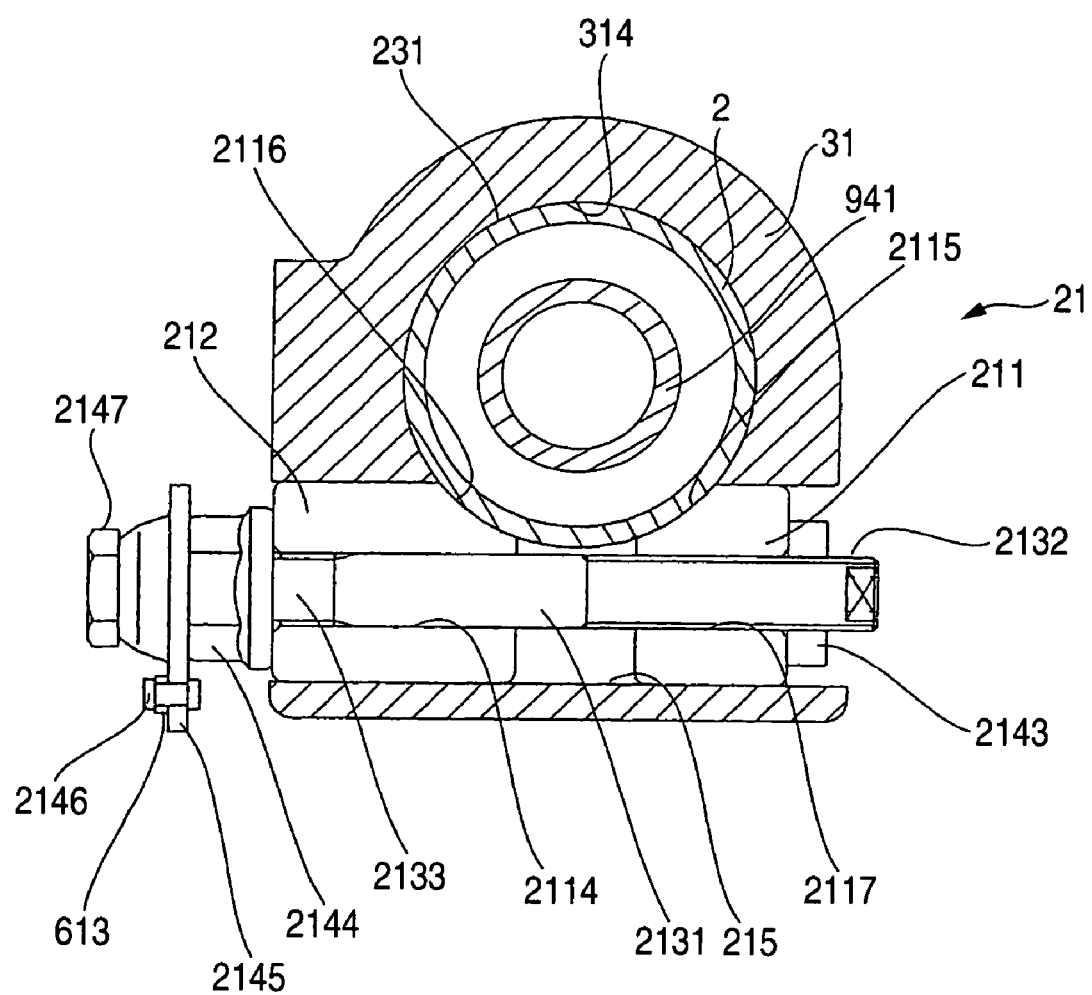
FIG. 12 is across-sectional view of the third embodiment, which is taken along line 12-12 shown in FIG. 11.

FIG. 10 is an external view of the third embodiment, which corresponds to FIG. 6 showing the second embodiment. FIG. 11 is a bottom view of the third embodiment, which is taken from a direction 11 shown in FIG. 10 and corresponds to FIG. 7 showing the second embodiment. FIG. 12 is a cross-sectional view of the third embodiment, which is taken along line 12-12 shown in FIG. 11 and corresponds to FIG. 5 showing the first embodiment.

Column Clamp

The configuration of the column clamp 21 is described by using FIGS. 10, 11, and 12. The column clamp 21 is provided in the column head 31 and has the first wedge 211, the second wedge 212, a clamping bolt 2131, and nuts 2143, 2144, and 2147, and a link plate 2145. A wedge hole 215 is bored in the column head 31 sideways, and partly opened in the cylindrical inner surface 314 of the column head 31.

The first wedge 211 and the second wedge 212 have clamp concave surfaces 2115 and 2116, respectively, and are accommodated in the wedge hole 215 so that these clamp concave surfaces 2115 and 2116 face each other. The clamp concave surfaces 2115 and 2116 of the two wedges face the cylindrical sliding guide portion 231 of the fixed column member 2.

A female screw 2117 is formed in the first wedges 211. A male screw 2132 formed on the right side of the clamping bolt 2131 is screwed into the female screw 2117. Further, a clamp bar hole 2114 is bored in the second wedge 212. The clamping bolt 2131 penetrates through this hole. The nut 2143 is screwed onto the right end of the male screw 2132. The nut 2144 is screwed onto the male screw 2133 at the left end of the clamping bolt 2131. The screwing amounts of these nuts 2143 and 2144 are adjusted. Thus, the gap between the cylindrical sliding guide portion 231 and each of the clamp concave surfaces 2115 and 2116 of the second wedge 212 is adjusted so as to obtain an appropriate clamping force.

The link plate 2145 is fitted onto the left end of the clamping bolt 2131, and intervened between the nuts 2147 and 22144. The link plate 2145 engages with the clamping bolt 2131 so that the direction of rotation thereof is regulated. A rocking motion of the link plate 2145 causes the clamping bolt 2131 to turn together with the link plate 2145.

As shown in FIG. 10, the link plate 2145 is connected to the left end of the column clamp bar 613 by a shaft pin 2146. The right end of the column clamp bar 613 is connected to the operating lever 701 by the shaft pin 2148. Therefore, when the operating lever 701 is rocked and moved by the left hand of the driver to a position indicated by double-dash-lines, as shown in FIG. 10, the column clamp bar 613 is rightwardly moved. The link plate 2145 swings counterclockwise. The clamping bolt 2131 turns counterclockwise.

When the clamping bolt 2131 turns counterclockwise, the male screw 2131 is loosened. Thus, the first wedge 211 moves rightwardly, as viewed in FIG. 12. Consequently, the second wedge 2121 also goes away from the cylindrical sliding guide portion 231. Thus, the column head 31 is unclamped.

Further, when the left hand is released from the operating lever 701, the operating lever 701 is caused by the pressing force of the spring 712 to swing clockwise and return to a position indicated by solid lines. The column clamp bar 613 leftwardly moves, so that the link plate 2145 swings clockwise, and that the clamping bolt 2131 turns clockwise.

Consequently, the male screw 2132 is tightened. Thus, the first wedge 211 moves leftwardly, as viewed in FIG. 12. Consequently, the two wedges come close to each other, so that is the clamp concave surfaces 2115 and 2116 push the cylindrical sliding guide portion 231 of the fixed column member 2, and that the column head 31 is clamped to the fixed column member 2. Incidentally, the first wedge 211 and the second wedge 212 can slightly and laterally move as one body. Thus, an unbalanced condition, in which only one of the wedges strongly pushes the fixed column member 2, does not occur.

In the third embodiment described above, the transmission path from the operating lever 701 to the column clamp 21 is shortened. Thus, the pressing force of the spring 712 effectively functions as the clamping force of the column clamp 21. Further, the structure of the apparatus is simplified, so that the manufacturing cost thereof can be reduced.

Fourth Embodiment

Figure 13:
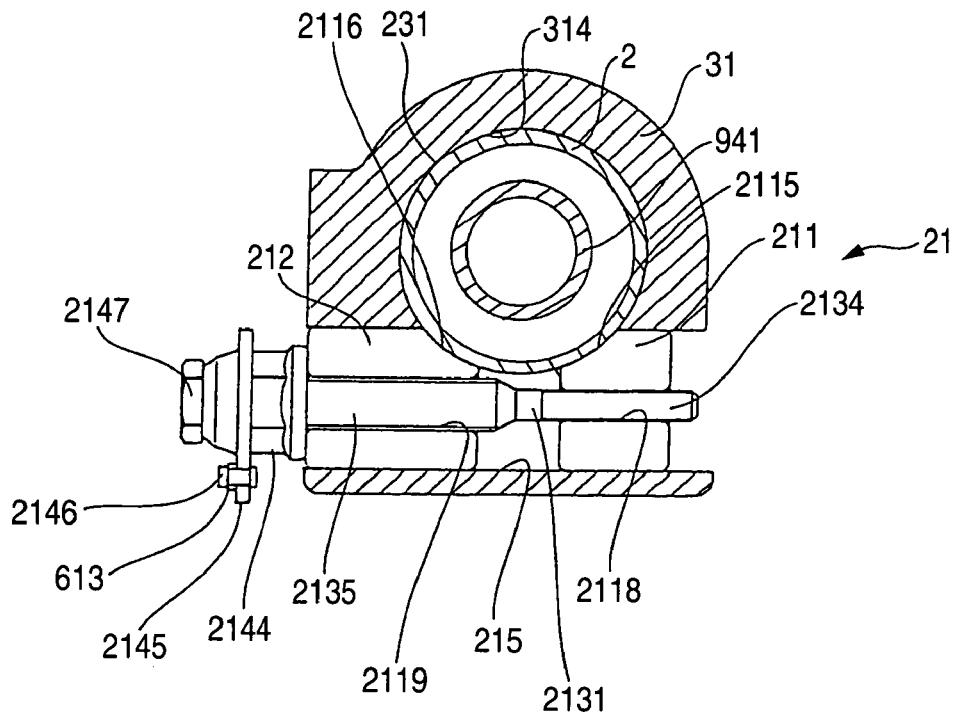
FIG. 13 is a cross-sectional view of a column clamp according to a fourth embodiment of the invention.

A steering column apparatus according to a fourth embodiment has a structure, which is substantially similar to that of the third embodiment as a whole. Therefore, the redundant description thereof is omitted. Further, reference characters used in the description thereof are substantially similar to those used in the descriptions of these embodiments. This steering column apparatus differs from the third embodiment only in the structure of the column clamp 21. The second wedge 212 corresponding to that of the third embodiment is moved by a screw. FIGS. 10 and 11 are common to the third embodiment and the fourth embodiment. FIG. 13 is a sectional view for explaining the fourth embodiment and corresponds to FIG. 12 showing the third embodiment.

As shown in FIG. 13, a right-hand female screw 2118 is formed in the first wedges 211. A right-hand male screw 2134 formed on the right side of the clamping bolt 2131 is screwed into this female screw 2118. Further, a left-hand female screw 2119 is bored in the second wedge 212. A left-hand male screw 2135 formed on the clamping bolt 2131 is screwed into this left-hand female screw 2119. The nut 2143 is screwed onto the right end of the male screw 2132. The nut 2144 is screwed onto the left-hand male screw 2135 of the clamping bolt 2131. The gap between the cylindrical sliding guide portion 231 and each of the clamp concave surfaces 2115 and 2116 of the second wedge 212 is adjusted by adjusting this nut 2144, so as to obtain an appropriate clamping force.

The link plate 2145 is fitted onto the left end of the clamping bolt 2131, and intervened between the nuts 2147 and 22144. The link plate 2145 engages with the clamping bolt 2131 so that the direction of rotation thereof is regulated. A rocking motion of the link plate 2145 causes the clamping bolt 2131 to turn together with the link plate 2145.

The link plate 2145 is connected to the left end of the column clamp bar 613 by a shaft pin 2146. Similarly to the structure of the third embodiment (FIGS. 10 and 11), the right end of the column clamp bar 613 is connected to the operating lever 701 by the shaft pin 2148. Therefore, when the operating lever 701 is rocked and moved by the left hand of the driver to a position indicated by double-dash-lines, the column clamp bar 613 is rightwardly moved. The link plate 2145 swings counterclockwise. The clamping bolt 2131 turns counterclockwise.

When the clamping bolt 2131 turns counterclockwise, the first wedge 211 and the second wedge 212 are forcibly away from each other by screwing the right-hand male screw 2134 and the left-hand male screw 2135 into the right-hand female screw 2118 and the left-hand female screw 2119, respectively. Consequently, the column head 31 is unclamped.

Further, when the left hand is released from the operating lever 701, the operating lever 701 is caused by the pressing force of the spring 712 to swing clockwise and return to a position indicated by solid lines. The column clamp bar 613 leftwardly moves, so that the link plate 2145 swings clockwise, and that the clamping bolt 2131 turns clockwise.

Consequently, the two wedges are forcibly caused by screwing the right-hand male screw 2134 and the left-hand male screw 2135 into the right-hand female screw 2118 and the left-hand female screw 2119, respectively, to come close to each other. Thus, the clamp concave surfaces 2115 and 2116 push the cylindrical sliding guide portion 231 of the fixed column member 2. Consequently, the column head 31 is clamped to the fixed column member 2.

The fourth embodiment, which has been described above, has the following advantage in addition to the advantages of the third embodiment. That is, because the two wedges are forcibly caused by both the inverse screws to come close to and go away from each other. Thus, the column head 31 can surely be clamped/unclamped.

Fifth Embodiment

Figure 14:
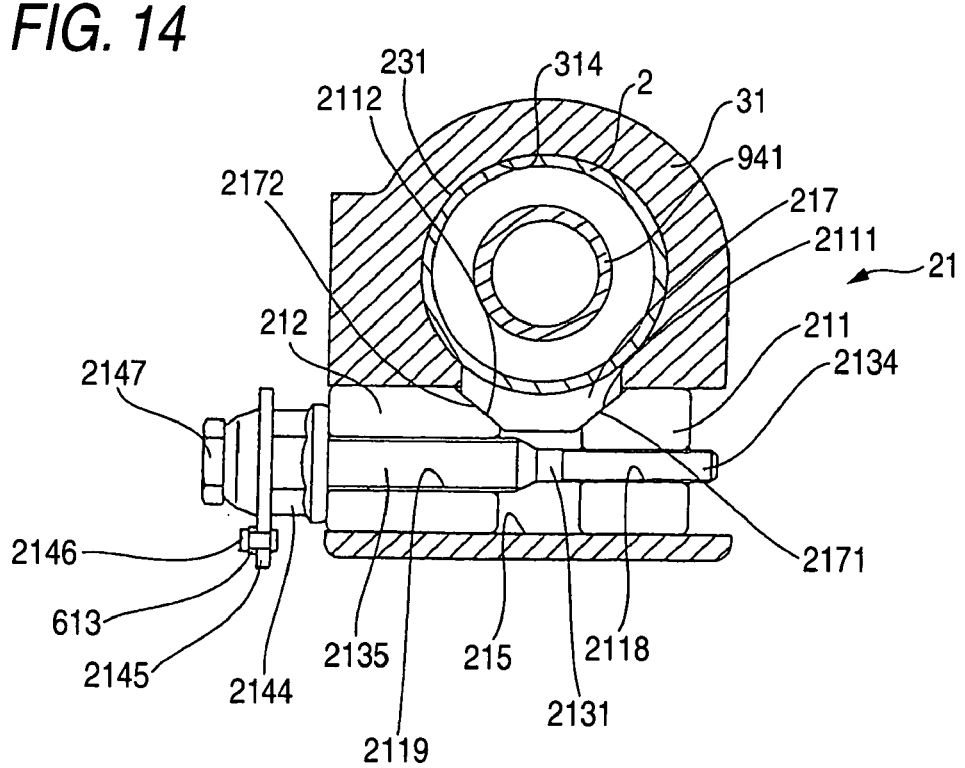
FIG. 14 is a cross-sectional view of a column clamp according to a fifth embodiment of the invention.

A steering column apparatus according to a fifth embodiment has a structure, which is substantially similar to those of the third and fourth embodiments as a whole. Therefore, the redundant description thereof is omitted. Further, reference characters used in the description thereof are substantially similar to those used in the descriptions of these embodiments. This steering column apparatus differs from the fourth embodiment in that the structure thereof is adapted to perform the clamping through the pressing plate. FIGS. 10 and 11 are common to the third embodiment and the fifth embodiment. FIG. 14 is a sectional view for explaining the fifth embodiment and corresponds to FIG. 12 showing the third embodiment.

As shown in FIG. 14, a right-hand female screw 2118 is formed in the first wedges 211. A right-hand male screw 2134 formed on the right side of the clamping bolt 2131 is screwed into this female screw 2118. Further, a left-hand female screw 2119 is bored in the second wedge 212. A left-hand male screw 2135 formed on the clamping bolt 2131 is screwed into this left-hand female screw 2119. The nut 2143 is screwed onto the right end of the male screw 2132. The nut 2144 is screwed onto the left-hand male screw 2135 of the clamping bolt 2131.

A pressing plate 217 is interposed between the cylindrical sliding guide portion 231 and each of the inclined surfaces 2111 and 2112 of the first wedge 211 and the second wedge 212. The gap between the inclined surfaces 2111 and 2112 of the first wedge 211 and the second wedge 212 and the inclined surfaces 2171 and 2172 of the pressing plate 217 is adjusted by adjusting this nut 2144, so as to obtain an appropriate clamping force.

Therefore, when the clamping bolt 2131 turns counterclockwise, the first wedge 211 and the second wedge 212 are forcibly caused by screwing the right-hand male screw 2134 and the left-hand male screw 2135 into the right-hand female screw 2118 and the left-hand female screw 2119, respectively, to go away from each other. Also, the pressing plate 217 is spaced apart from the outer periphery of the cylindrical sliding guide portion 231. Thus, the column head 31 is unclamped.

Further, when the left hand is released from the operating lever 710, the clamping bolt 2131 turns clockwise. Consequently, the two wedges are forcibly caused by screwing the right-hand male screw 2134 and the left-hand male screw 2135 into the right-hand female screw 2118 and the left-hand female screw 2119, respectively, to come close to each other. Thus, the pressing plate 217 pushes the cylindrical sliding guide portion 231 of the fixed column member 2. Consequently, the column head 31 is clamped to the fixed column member 2.

The fifth embodiment, which has been described above, has the following advantages in addition to the advantages of the fourth embodiment. That is, the outer periphery of the fixed column member 2 is clamped/unclamped through the pressing plate 217. Thus, the wedge is prevented from biting the cylindrical sliding guide portion 231. Clamping/unclamping operations can surely be performed. Enhancement of durability can be expected.

Sixth Embodiment

Figure 15:
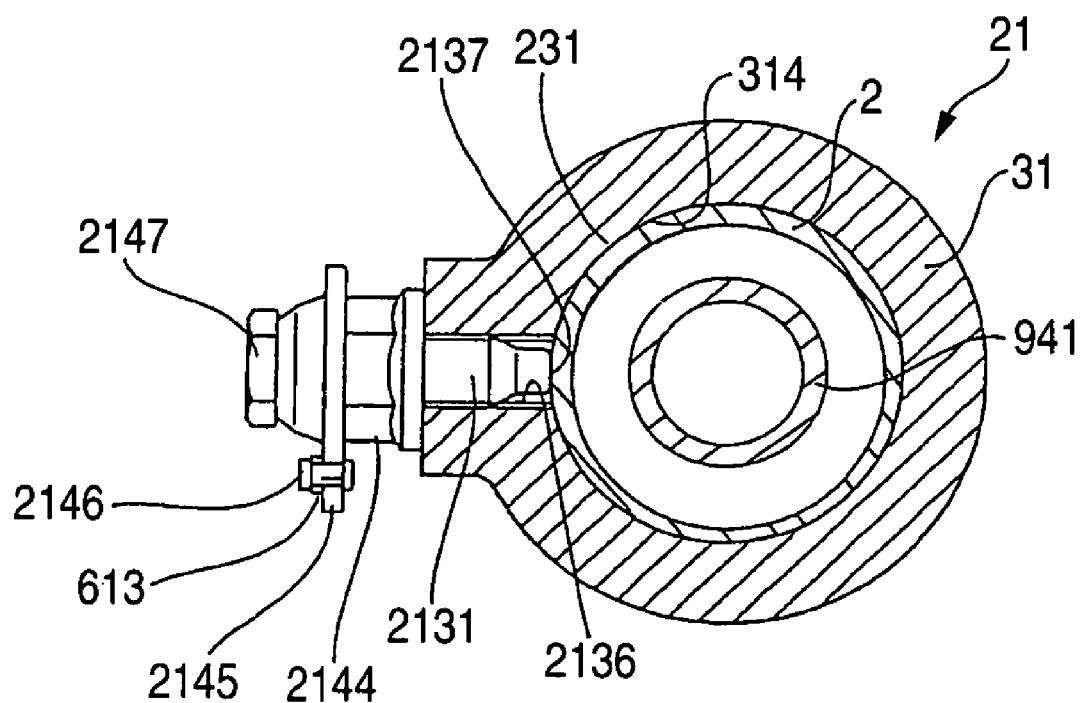
FIG. 15 is a cross-sectional view of a column clamp according to a sixth embodiment of the invention.

A steering column apparatus according to a sixth embodiment has a structure, which is substantially similar to those of the third, fourth and fifth embodiments as a whole. Therefore, the redundant description thereof is omitted. Further, reference characters used in the description thereof are substantially similar to those used in the descriptions of these embodiments. This steering column apparatus differs from the third embodiment in the structure in which the outer periphery of the cylindrical sliding guide portion 231 of the fixed column member 2 is directly clamped by the clamping bolt. FIGS. 10 and 11 are common to the third embodiment and the sixth embodiment. FIG. 15 is a sectional view for explaining the sixth embodiment and corresponds to FIG. 12 showing the third embodiment.

The clamping bolt 2131 is screwed directly into the female screw 2136 formed in the column head 31. The right end surface 2137 of the clamping bolt 2131 directly abuts against the outer periphery of the cylindrical sliding guide portion 231 of the fixed column member 2. Further, the nut 2144 is screwed onto the left end of the clamping bolt 2131. The screwing-in and screwing-out of the clamping bolt 213 are controlled by adjusting this nut 2144 so as to an appropriate clamping force.

The link plate 2145 is fitted onto the left end of the clamping bolt 2131, and intervened between the nuts 2147 and 22144. The link plate 2145 engages with the clamping bolt 2131 so that the direction of rotation thereof is regulated. A rocking motion of the link plate 2145 causes the clamping bolt 2131 to turn together with the link plate 2145.

When the clamping bolt 2131 turns counterclockwise, the right end surface 2137 of the clamping bolt 2131 is released from the outer periphery of the cylindrical sliding guide portion 231 of the fixed column member 2. Thus, the column head 31 is unclamped.

Further, when the clamping bolt 2131 turns clockwise, the right end surface 2137 of the clamping bolt 2131 abuts against the outer periphery of the cylindrical sliding guide portion 231 of the fixed column member 2. Thus, the column head 31 is clamped to the fixed column member 2.

According to the sixth embodiment hating been described above, the transmission path from the operating lever 701 to the column clamp 21 is shortest. Thus, the pressing force of the spring 712 acts most effectively as the clamping force of the column clamp 21.

In the steering apparatus according to the invention, the column clamp for clamping/unclamping the column head at the height adjustment position thereof is provided at the side of the column head that moves with respect to the vehicle body. Thus, a force transmission path from the operation lever to the column clamp is shortened. Consequently, the structure thereof is simple. The stiffness thereof is large. The efficiency in converting a column clamp force is high. The cost thereof can be reduced.

Also, the operation lever is provided in the column head. Thus, regardless of the inclined position of the tilting head, the position of the operation lever is constant, so that a driver does not look up the operation lever position. Consequently, a quick operation of the operation lever is enabled.

What is claimed is:

1. A steering column apparatus, comprising:
a fixed column member having a vehicle body attachment portion to be attached to a vehicle body;
a column head supported by the fixed column member movably in a direction of a center shaft of the fixed column member;
a wheel shaft, rotatably supported by the column head, for fixing a steering wheel to an end thereof;
a column clamp, provided in the column head, for putting the column head into a state in which the column head is clamped to or unclamped from the fixed column member;
an operation lever having a rocking shaft in the column head; and
a mechanical transmission apparatus for transmitting a rocking motion of the operation lever to the column clamp.

2. A steering column apparatus, comprising:
a fixed column member having a vehicle body attachment portion to be attached to a vehicle body;
a column head supported by the fixed column member unrotatably around a center shaft and movably in a direction of the center shaft;
a tilt head tiltably supported by the column head;
a wheel shaft, rotatably supported by the tilt head, for fixing a steering wheel to an end thereof;
a column clamp, provided in the column head, for putting the column head into a state in which the column head is clamped to or unclamped from the fixed column member;
a tilt head clamp for clamping/unclamping the tilt head to/from the column head;
an operation lever having a rocking shaft in the column head; and
a mechanical transmission apparatus for transmitting a rocking motion of the operation lever to the column clamp and to the tilt head clamp.

3. The steering column apparatus according to claim 2, wherein the mechanical transmission apparatus has a pusher plate, a pusher rod, a rocking arm, and a column clamp shaft;
the pusher plate is provided on the operation lever and enabled to abut against an end of the pusher rod;
the pusher rod is slidable in a direction being parallel to a tilt center shaft of the tilt head and supported by the column head;
the rocking arm has an end engaging with the pusher rod at an end thereof and also has the other end fixed to the column clamp shaft; and,
when the operation lever is operated, a rocking motion of this operation lever is sequentially converted into a rocking motion of the pusher plate, an axial motion of the pusher rod, a rocking motion of the rocking arm, and a rotating motion of the column clamp shaft.

4. The steering column apparatus according to claim 2, wherein the column clamp clamps/unclamps the column head to/from the fixed column member at least at two places spaced apart from each other in a direction of the center shaft of the column head.

5. The steering column apparatus according to claim 2,
wherein the column clamp has a first wedge, a second wedge, and a column clamp shaft;
the first wedge and the second wedge are spaced apart from each other in a direction of the center shaft of the column head and supported by the column head movably in a direction being parallel and perpendicular to the center shaft of the column head;
an inclined surface engaging with an inclined surface formed at a side of the column head is formed on an end of each of the first wedge and the second wedge;
a clamping surface for clamping the fixed column member is formed at the other end of each of the first wedge and the second wedge;
the column clamp shaft is provided in the column head rotatably around an axis being parallel to the center shaft of the column head or movably in parallel to the center shaft;
rotation or movement of the column clamp shaft enables the first wedge and the second wedge to come close to or go away from each other in parallel to the center shaft of the column head; and
the first wedge and the second wedge come close to or go away from each other to thereby cause the clamping surface, which is formed at the other end of each of the first wedge and the second wedge, to clamp the column head to the fixed column member.

6. The steering column apparatus according to claim 5,
wherein mechanism for converting a rotation of the column clamp shaft into a motion of the first wedge and the second wedge, during which the first wedge and the second wedge come close to or go away from each other, is a cam mechanism formed between the column clamp shaft and the first wedge or between the column clamp shaft and the second wedge.

7. The steering column apparatus according to claim 6,
wherein the cam mechanism comprises:
a cam formed in the first wedge or the second wedge; and
a pin provided on the column clamp shaft and adapted to engage with the cam.

8. The steering column apparatus according to claim 2,
wherein the column clamp has a first wedge, a second wedge, a clamping bolt, and a column clamp shaft;
the first wedge and the second wedge are supported by the column head movably in a direction being parallel to the tilt center shaft of the tilt head;
a clamping surface engaging with an outer periphery of the fixed column member is formed on an end of each of the first wedge and the second wedge;
the clamping bolt is provided in the column head rotatably around a shaft being parallel to the tilt center shaft;
the column clamp shaft is provided in the column head rotatably around an axis being parallel to the center shaft of the column head or movably in parallel to the center shaft;
rotation of the column clamp shaft causes the clamping bolt to rotate and enables the first wedge and the second wedge to come close to or go away from each other in parallel to the tilt center shaft; and
the first wedge and the second wedge come close to or go away from each other to thereby cause the clamping surfaces of the first wedge and the second wedge to clamp the column head to the fixed column member.

9. The steering column apparatus according to claim 8,
wherein a mechanism for converting a rotation of the clamping bolt into a motion of the first wedge and the second wedge, during which the first wedge and the second wedge come close to or go away from each other, is a screw formed between the clamping bolt and the first wedge or between the clamping bolt and the second wedge.

10. The steering column apparatus according to claim 8,
wherein a mechanism for converting a rotation of the clamping bolt into a motion of the first wedge and the second wedge, during which the first wedge and the second wedge come close to or go away from each other, comprises:
a screw formed between the clamping bolt and the first wedge; and
a screw, which is formed between the clamping bolt and the second wedge and has a lead angle set in a direction being reverse to a direction in which a lead angle of the screw formed between the clamping bolt and the first wedge.

11. The steering column apparatus according to claim 2,
wherein the column clamp has a first wedge, a second wedge, a clamping bolt, and a column clamp bar;
the first wedge and the second wedge are supported by the column head movably in a direction being parallel to the tilt center shaft of the tilt head;
a clamping surface engaging with an outer periphery of the fixed column member is formed on an end of each of the first wedge and the second wedge;
the clamping bolt is provided in the column head rotatably around a shaft being parallel to the tilt center shaft;
the column clamp bar is provided in the column head movably in parallel to the center shaft of the column head;
movement of the column clamp shaft causes the clamping bolt to rotate and enables the first wedge and the second wedge to come close to or go away from each other in parallel to the tilt center shaft; and
the first wedge and the second wedge come close to or go away from each other to thereby cause the clamping surfaces of the first wedge and the second wedge to clamp the column head to the fixed column member.

12. The steering column apparatus according to claim 2,
wherein the column clamp has a first wedge, a second wedge, a pressing plate, a clamping bolt, and a column clamp shaft;
the first wedge and the second wedge are supported by the column head movably in a direction being parallel to the tilt center shaft of the tilt head;
an inclined surface facing an outer periphery of the fixed column member is formed on an end of each of the first wedge and the second wedge;
the pressing plate is interposed between the outer periphery of the fixed column member and the inclined surface of each of the first wedge and the second wedge;
a clamping surface for clamping the fixed column member is formed on the pressing plate;
the clamping bolt is provided in the column head rotatably around a shaft being parallel to the tilt center shaft;
the column clamp shaft is provided in the column head rotatably around an axis being parallel to the center shaft of the column head or movably in parallel to the center shaft;
rotation of the column clamp shaft causes the clamping bolt to rotate and enables the first wedge and the second wedge to come close to or go away from each other in parallel to the tilt center shaft; and the first wedge and the second wedge come close to or go away from each other to thereby cause the clamping surface of the pressing plate to clamp the column head to the fixed column member.

13. The steering column apparatus according to claim 2, wherein the column clamp has a first wedge, a second wedge, a pressing plate, a clamping bolt, and a column clamp bar;

the first wedge and the second wedge are supported by the column head movably in a direction being parallel to the tilt center shaft of the tilt head;

an inclined surface facing an outer periphery of the fixed column member is formed on an end of each of the first wedge and the second wedge;

the pressing plate is interposed between the outer periphery of the fixed column member and the inclined surface of each of the first wedge and the second wedge;

a clamping surface for clamping the fixed column member is formed on the pressing plate;

the clamping bolt is provided in the column head rotatably around a shaft being parallel to the tilt center shaft;

the column clamp bar is provided in the column head movably in parallel to the center shaft of the column head;

movement of the column clamp shaft causes the clamping bolt to rotate and enables the first wedge and the second wedge to come close to or go away from each other in parallel to the tilt center shaft; and the first wedge and the second wedge come close to or go away from each other to thereby cause the clamping surface of the pressing plate to clamp the column head to the fixed column member.

14. The steering column apparatus according to claim 2, wherein the column clamp has a clamping bolt, and a column clamp bar;

the clamping bolt is screwed into the column head movably in a direction being parallel to the tilt center shaft;

a clamping surface engaging with an outer periphery of the fixed column member is formed on an end of the clamping bolt;

the column clamp bar is provided in the column head movably in parallel to the center shaft of the column head;

movement of the column clamp shaft causes the clamping bolt to rotate; and rotation of the clamping bolt causes the clamping surface of the clamping bolt to clamp the column head to the fixed column member.

15. The steering column apparatus according to claim 2, wherein the operation lever comprises:

an operating lever enabled to rock around a lever center shaft being parallel to the tilt center shaft of the tilt head; and a driven lever enabled to rock around the lever center shaft being perpendicular to the tilt center shaft by following a rocking motion of the operating lever.

* * * * *